(12) United States Patent
Larson et al.

(10) Patent No.: US 7,280,733 B2
(45) Date of Patent: Oct. 9, 2007

(54) FIBER TERMINATION PLATFORM FOR OPTICAL CONNECTORS

(75) Inventors: Donald K. Larson, Cedar Park, TX (US); Paul N. Winberg, Rollingwood, TX (US); Chansool Park, Seoul, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/551,762

(22) Filed: Oct. 23, 2006

(65) Prior Publication Data

US 2007/0104445 A1    May 10, 2007

Related U.S. Application Data

(60) Provisional application No. 60/729,629, filed on Oct. 24, 2005, provisional application No. 60/743,119, filed on Jan. 11, 2006, provisional application No. 60/744,180, filed on Apr. 3, 2006, provisional application No. 60/805,038, filed on Jun. 16, 2006, provisional application No. 60/819,226, filed on Jul. 7, 2006.

(51) Int. Cl.
*G02B 6/00* (2006.01)
*G02B 6/255* (2006.01)

(52) U.S. Cl. .................. 385/139; 385/134; 385/95; 385/98

(58) Field of Classification Search .......... 385/95, 385/97–99, 134, 136, 139
See application file for complete search history.

(56) References Cited

U.S. PATENT DOCUMENTS

| 4,824,197 A | 4/1989 | Patterson |
|---|---|---|
| 5,040,867 A | 8/1991 | de Jong et al. |
| 5,102,212 A | 4/1992 | Patterson |
| 5,138,681 A | 8/1992 | Larson et al. |
| 5,155,787 A | 10/1992 | Carpenter et al. |
| 5,159,653 A | 10/1992 | Carpenter et al. |
| 5,261,020 A | 11/1993 | de Jong et al. |
| 5,339,379 A | 8/1994 | Kutsch et al. |
| 5,414,790 A | 5/1995 | Lee et al. |
| 5,778,130 A | 7/1998 | Walters et al. |
| 5,857,045 A | 1/1999 | Lee |

(Continued)

FOREIGN PATENT DOCUMENTS

JP    11-160563    6/1999

(Continued)

OTHER PUBLICATIONS

U.S. Appl. No. 11/318,957, filed Dec. 27, 2005, entitled "Assembly Tool and Optical Connector Assembly Method".

(Continued)

*Primary Examiner*—Hemang Sanghavi
(74) *Attorney, Agent, or Firm*—Gregg H. Rosenblatt

(57) ABSTRACT

A field termination platform and method for field termination of an optical fiber in an optical fiber connector are provided. The field termination platform includes a base configured to hold the optical fiber connector having a pre-assembled fiber stub. An actuation mechanism is disposed on the base to actuate a splice element of the optical connector and to actuate a buffer clamping portion of the optical connector. A fiber holder is provided to hold the optical fiber in the termination platform during termination.

26 Claims, 25 Drawing Sheets

U.S. PATENT DOCUMENTS

| | | | |
|---|---|---|---|
| 5,862,289 A * | 1/1999 | Walter et al. | 385/134 |
| 5,909,528 A | 6/1999 | Tamekuni et al. | |
| 6,439,780 B1 | 8/2002 | Mudd et al. | |
| 6,816,661 B1 | 11/2004 | Barnes et al. | |
| 2004/0258370 A1 | 12/2004 | Bush et al. | |
| 2006/0072884 A1 | 4/2006 | Yamauchi et al. | |
| 2006/0153515 A1 | 7/2006 | Honma et al. | |
| 2006/0165352 A1 * | 7/2006 | Caveney et al. | 385/87 |
| 2006/0280417 A1 | 12/2006 | Sato et al. | |

FOREIGN PATENT DOCUMENTS

| | | |
|---|---|---|
| JP | 2005-134583 A | 5/2005 |
| WO | WO 2006/019515 A1 | 2/2006 |
| WO | WO 2006/019516 A1 | 2/2006 |

OTHER PUBLICATIONS

U.S. Appl. No. 11/551,760, filed Oct. 23, 2006, entitled "Optical Connector and Fiber Distribution Unit".

Product Brochure, "UniCam® Connector Critical Steps"; Corning Cable Systems LLC, Hickory, NC (Jul. 2001).

Product Manual, "Installations Instructions for 1 and 2-Fiber UniCam® Connectors"; Corning Cable Systems LLC, Hickory, NC; Issue 4 (Dec. 2004).

* cited by examiner

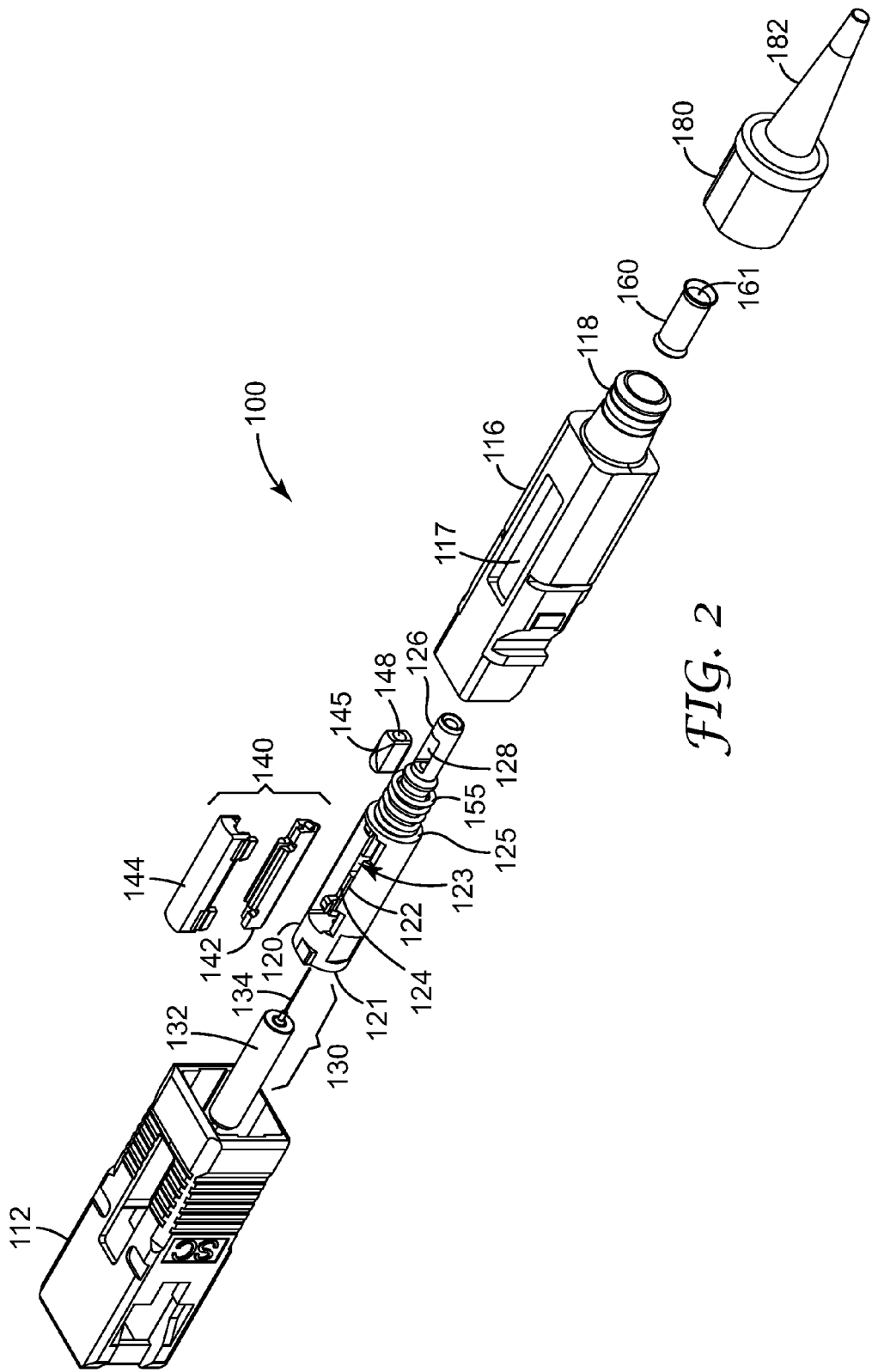

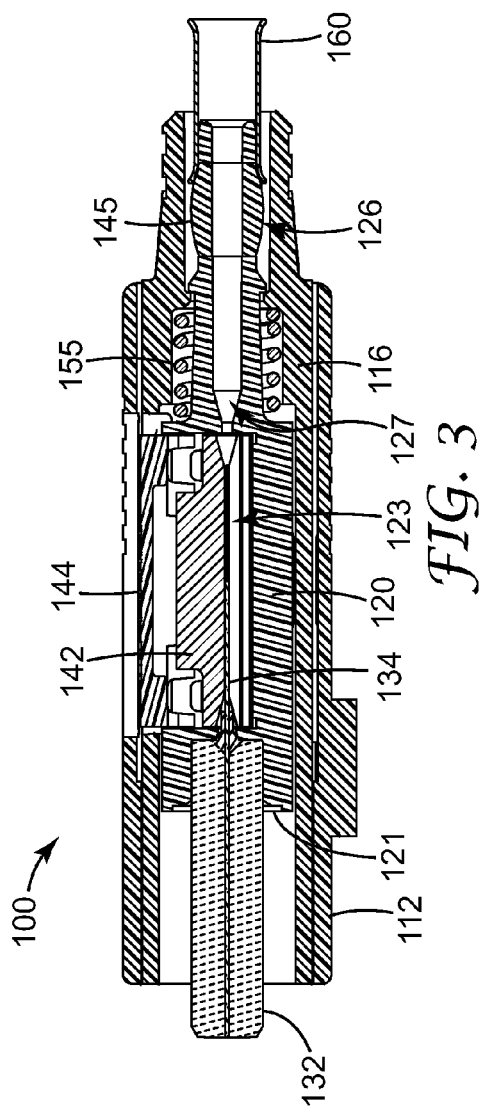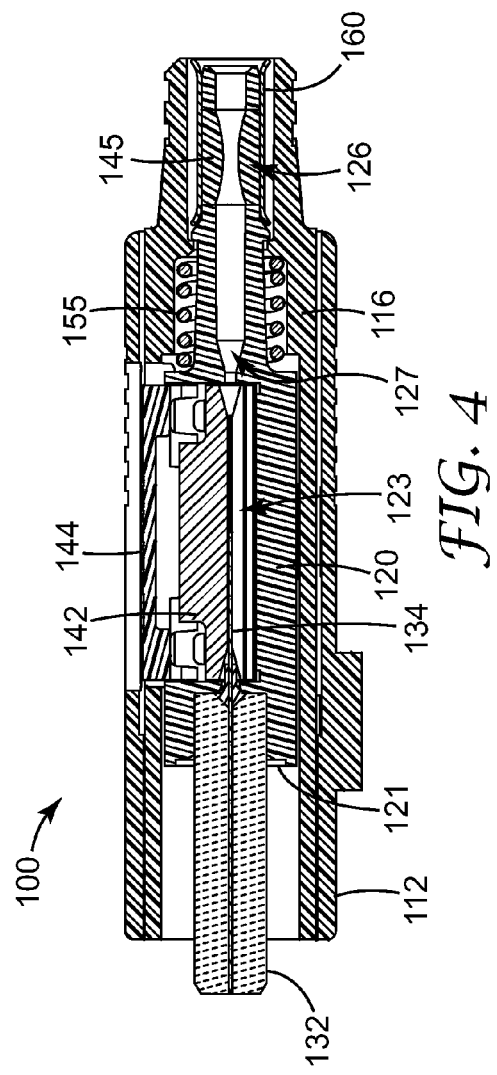

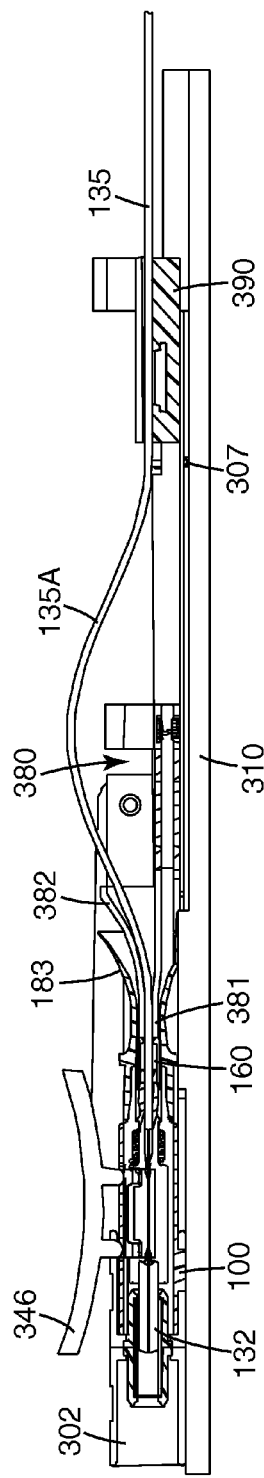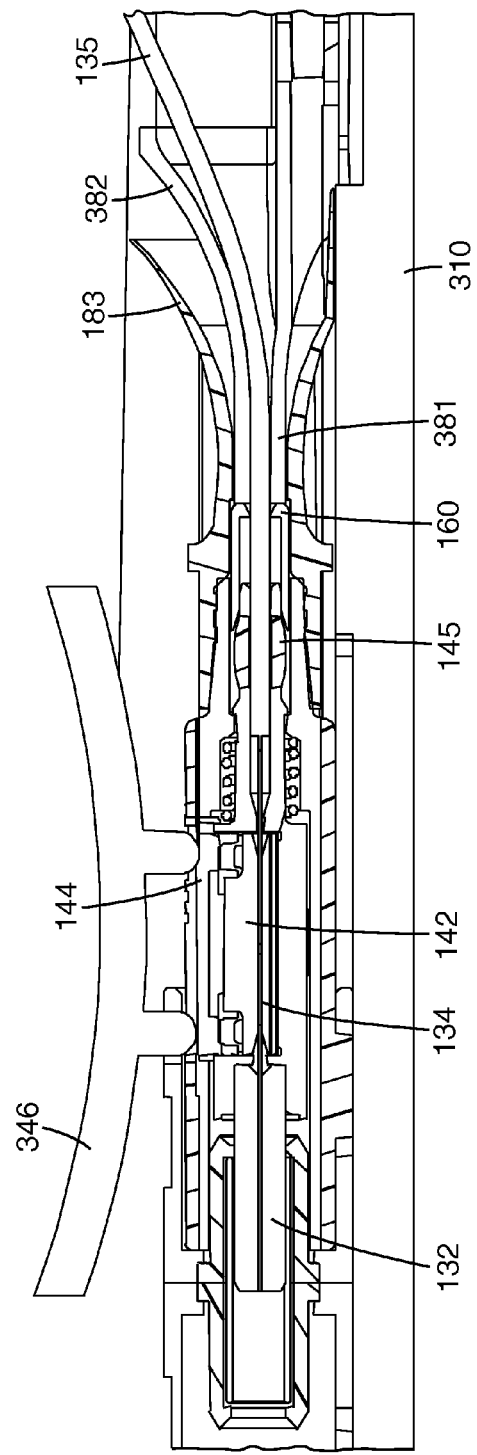

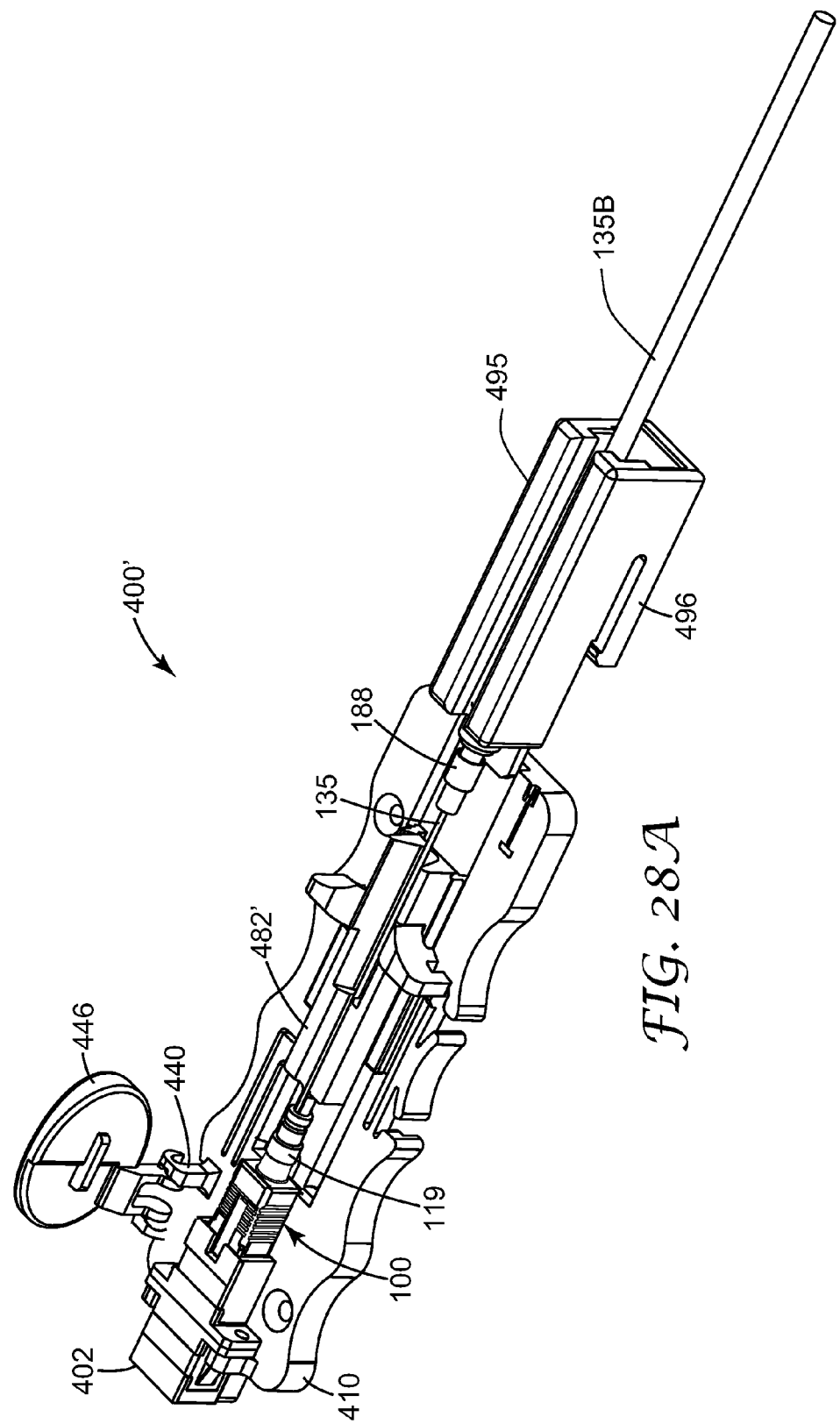

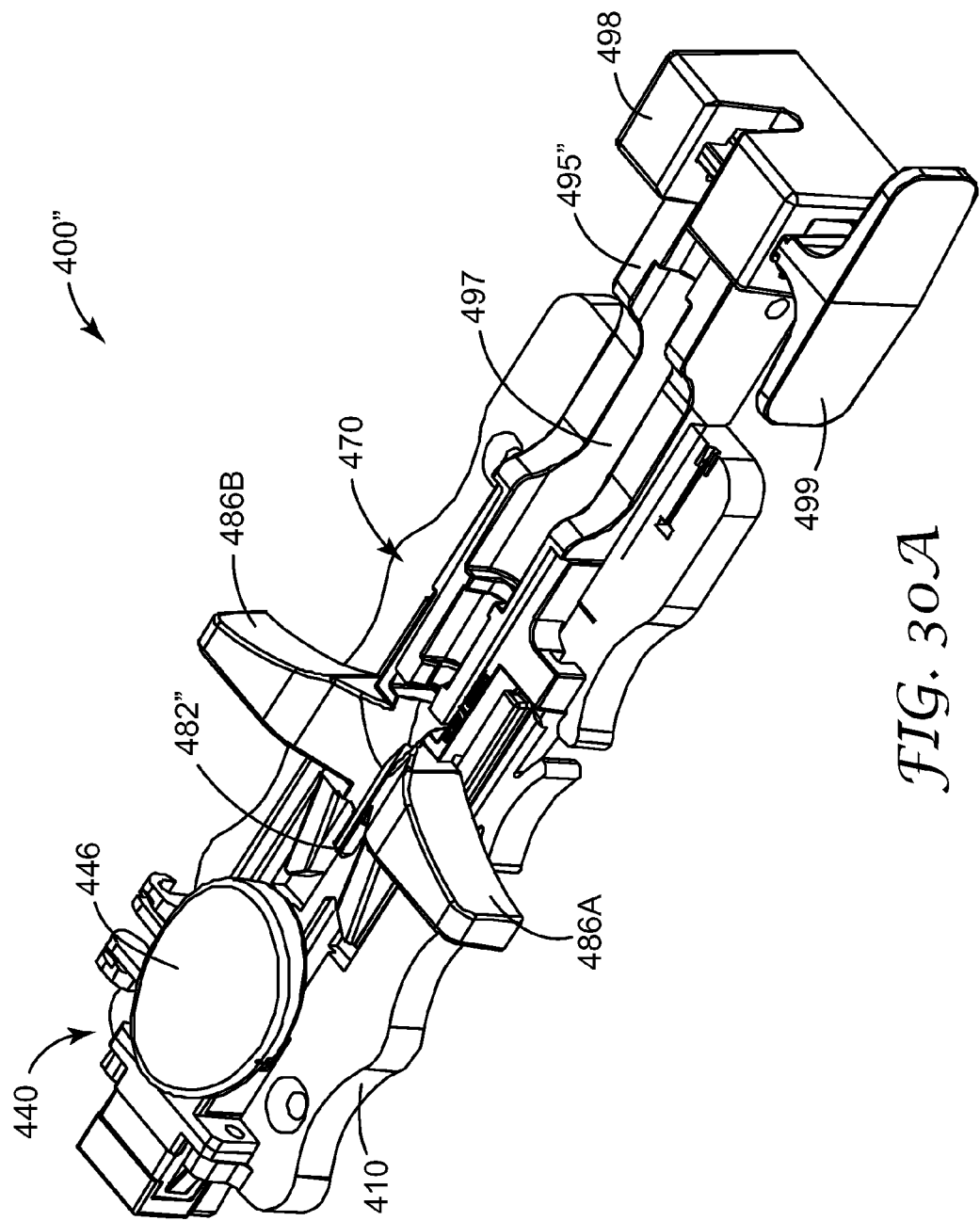

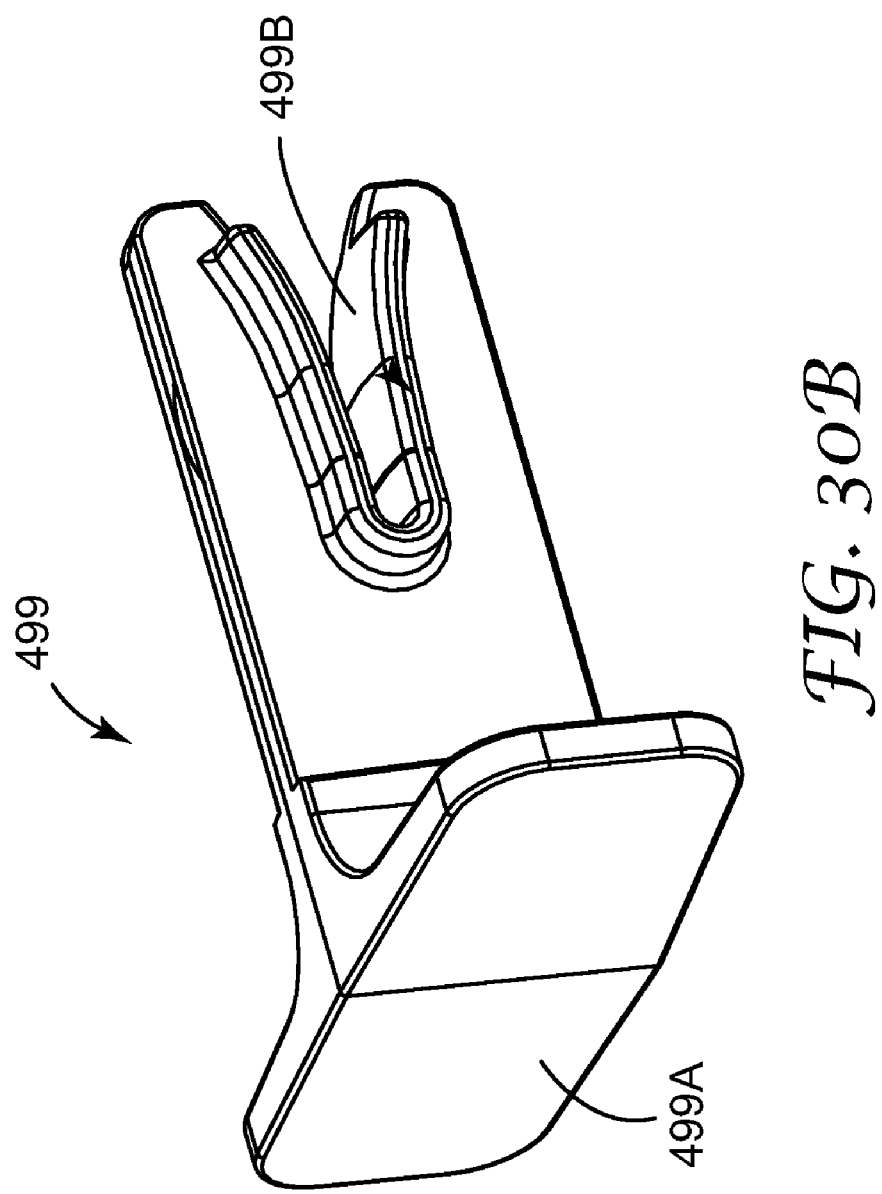

FIBER TERMINATION PLATFORM FOR OPTICAL CONNECTORS

CROSS REFERENCE TO RELATED APPLICATIONS

The present application claims the benefit of U.S. Provisional Application Ser. No. 60/729,629 filed on Oct. 24, 2005; U.S. Provisional Application Ser. No. 60/743,119 filed on Jan. 11, 2006; U.S. Provisional Application Ser. No. 60/744,180 filed on Apr. 3, 2006; U.S. Provisional Application Ser. No. 60/805,038 filed on Jun. 16, 2006; and U.S. Provisional Application Ser. No. 60/819,226 filed on Jul. 7, 2006. The disclosures of each of the aforementioned Provisional Applications are incorporated by reference herein in their entirety.

BACKGROUND OF THE INVENTION

1. Field of the Invention

The present invention is directed to an optical connector.

2. Related Art

Mechanical optical fiber connectors for the telecommunications industry are known. For example, LC, ST, FC, and SC optical connectors are widely used.

However, commercially available optical connectors are not well suited for field installations. Typically, an adhesive is required to mount these types of connectors on to an optical fiber. This process can be awkward and time consuming to perform in the field. Also post-assembly polishing requires that the craftsman have a higher degree skill.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

SUMMARY OF THE INVENTION

According to a first aspect of the present invention, an optical connector for terminating an optical fiber comprises a housing configured to mate with a receptacle and a collar body disposed in the housing. The collar body includes a fiber stub disposed in a first portion of the collar body, the fiber stub including a first optical fiber mounted in a ferrule and having a first end proximate to an end face of the ferrule and a second end. The collar body also includes a mechanical splice disposed in a second portion of the collar body, the mechanical splice configured to splice the second end of the fiber stub to a second optical fiber. The collar body also includes a buffer clamp configured within a third portion of the collar body, the buffer clamp configured to clamp at least a portion of a buffer cladding of the second fiber upon actuation.

In one aspect, the optical connector further comprises a fiber boot coupled to an end of the housing to restrict a lateral motion of the second optical fiber. In alternative aspects, the boot can include a tapered tail section, a funnel-shaped tail section, or a segmented tail section.

In another aspect, the optical connector further comprises an adapter ring positioned over the backbone of the connector. In alternative aspects, a fiber boot can comprise a crimp ring, to crimp the strength member(s) of the fiber cable to the connector. The fiber boot can also include an outer jacket to restrict a lateral motion of the fiber cable. The fiber boot can also include a cable jacket crimp ring to directly crimp onto the outer jacket of the fiber cable and to further reduce potential axial strain and axial movement of the fiber components therein.

In another aspect, the optical connector can further include a buffer clamp actuation sleeve configured to be received on an outer surface of the third portion of the collar body and configured to actuate the buffer clamp.

In another aspect, the optical connector is configured to mate with an SC receptacle.

In another aspect, the housing comprises an outer shell and a backbone that is housed inside the shell, wherein the collar body is retained within the backbone.

In another aspect, the mechanical splice comprises a splice element and an actuating cap.

In another aspect, the buffer clamp comprises a clamping element receivable in the third portion and comprising a surface feature that is collapsible upon actuation. In an alternative aspect, the buffer clamp comprises a ridge structure formed on the outer surface of the third portion that is collapsible upon actuation. In a further alternative aspect, the buffer clamp comprises a dual-tab structure formed within the third portion and having a portion thereof extending outside the outer surface of the third portion that is collapsible upon actuation.

According to another aspect of the present invention, a fiber termination platform is provided. The termination platform includes a base that can hold an optical fiber connector having a pre-assembled fiber stub. The termination platform further includes a first actuation mechanism to actuate a splice element of the optical connector. The termination platform also includes a second actuation mechanism to actuate a buffer clamping portion of the optical connector. The termination platform can also include a fiber holder to hold the fiber in the termination platform during termination.

According to another aspect of the present invention, a method for terminating an optical fiber in an optical connector includes providing an optical fiber connector having a pre-assembled fiber stub. The optical fiber connector also includes a mechanical splice element and a buffer clamp element. The pre-assembled optical connector is held on a termination platform. The end of the fiber to be terminated is then prepared. The fiber preparation includes stripping off a portion of the plastic outer jacket and cleaving the fiber end. The fiber can be held in a portion of the termination platform during preparation. The prepared fiber is then inserted in the pre-assembled connector until a fiber bow is evident. The splice element is actuated coupling the prepared end to the fiber stub. The fiber buffer is clamped within the optical connector. The fiber bow is released and the optical connector is removed from the termination platform.

According to another aspect of the present invention, a method for terminating an optical fiber in an optical connector also includes crimping fiber cable strength members to an adapter ring fitted to the backbone of the connector to provide axial strain relief.

According to another aspect of the present invention, a fiber distribution unit includes a tray movably mountable to a fiber distribution cabinet. The tray further includes a face configured to receive a plurality of couplings. Each of the couplings is configured to receive an optical connector for terminating an optical fiber from a distribution line. The connector comprises a housing configured to mate with a receptacle and a collar body disposed in the housing. The collar body includes a fiber stub disposed in a first portion of the collar body, the fiber stub including a first optical fiber mounted in a ferrule and having a first end proximate to an end face of the ferrule and a second end. The collar body also includes a mechanical splice disposed in a second portion of the collar body, the mechanical splice configured to splice the second end of the fiber stub to an optical fiber from a distribution line. The collar body also includes a buffer clamp configured within a third portion of the collar body, the buffer clamp configured to clamp at least a portion of a buffer cladding of the second fiber upon actuation. In an alternative aspect, the optical connector further comprises a fiber boot coupled to an end of the housing, where the boot can include a funnel-shaped tail section.

In addition, the movably mountable tray can include a set of fiber guides that guide the optical fiber from the distribution line into position when the unit is placed in a closed position. The fiber distribution unit can further include one or more sets of fiber retainer clips or structures that provide compact fiber slack looping on the tray.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 2 is an exploded view of an optical connector according to an embodiment of the present invention.

FIG. 3 is a cross-section side view of the exemplary optical connector of FIG. 2.

FIG. 4 is another cross-section side view of the exemplary optical connector of FIG. 2.

FIG. 19 is a cross section view of a field termination platform having a fiber being installed therein according to an alternative embodiment of the present invention.

FIG. 20 is another cross section view of a field termination platform having a fiber being installed therein according to an alternative embodiment of the present invention.

FIGS. 28A and 28B show isometric views of a field termination platform having a fiber being installed therein according to an alternative embodiment of the present invention.

FIG. 30A is an isometric view of another field termination platform according to an alternative embodiment of the present invention and FIG. 30B shows a close-up view of a cable jacket gripping device.

Figure 1:
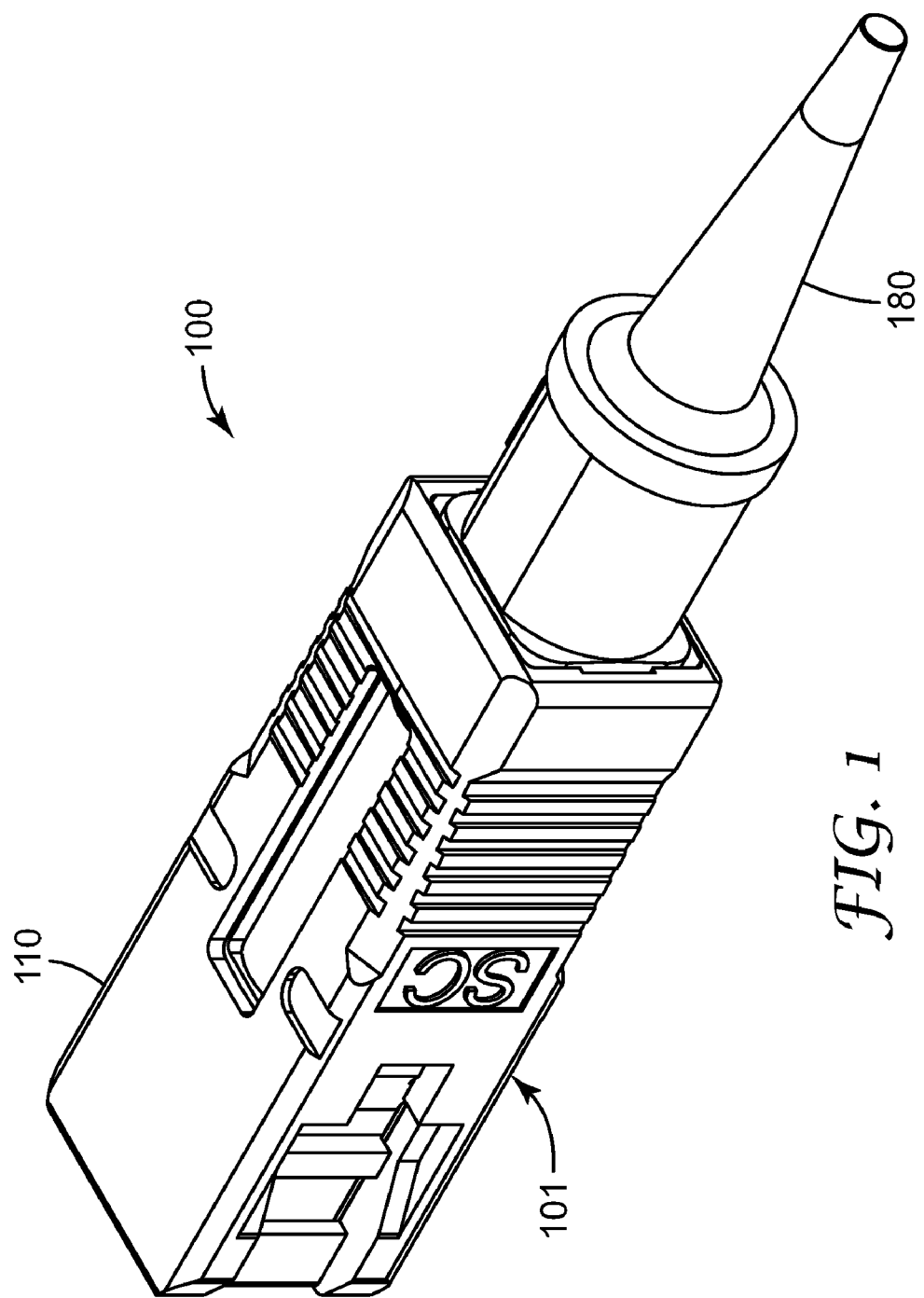
FIG. 1 is an isometric view of an optical connector according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

The present invention is directed to an optical connector. In particular, the optical connector of the exemplary embodiments is of compact length and is capable of straightforward field termination. Further, with the straightforward connector termination platform and procedure described herein, reduced assembly times in field termination applications can be accomplished. The exemplary connector(s) described herein can be readily installed and utilized for Fiber To The Home (FTTH) and/or Fiber To The X (FTTX) network installations. The exemplary connector(s) can be utilized in installation environments that require ease of use when handling multiple connections, especially where labor costs are more expensive.

According to an exemplary embodiment of the present invention, an optical fiber connector 100 is shown in isometric view in FIG. 1 and in exploded view in FIG. 2. Optical connector 100 is configured to mate with a receptacle. For example, as shown in FIG. 1, exemplary optical connector 100 is configured as having an SC format. However, as would be apparent to one of ordinary skill in the art given the present description, optical connectors having other standard formats, such as ST, FC, and LC connector formats can also be provided.

SC-type optical fiber connector 100 can include a connector body 101 having a housing 110 and a fiber boot 180. In this exemplary embodiment, housing 110 includes an outer shell 112, configured to be received in an SC receptacle (e.g., an SC coupling, an SC adapter, or an SC socket), and a backbone 116 that is housed inside the shell 112 and that provides structural support for the connector 100. In addition, backbone 116 further includes at least one access opening 117, which can provide access to actuate a mechanical splice disposed within the connector. Backbone 116 can further include a mounting structure 118 that provides for coupling to the fiber boot 180, which can be utilized to protect the optical fiber from bend related stress losses. According to an exemplary embodiment of the present invention, shell 112 and backbone 116 are formed or molded from a polymer material, although metal and other suitably rigid materials can also be utilized. Shell 112 is preferably secured to an outer surface of backbone 116 via snap fit.

Connector 100 further includes a collar body 120 that is disposed within the connector housing and retained therein. According to exemplary embodiments, the collar body 120 is a multi-purpose element that can house a fiber stub assembly 130, a mechanical splice 140, and a fiber buffer clamp (such as buffer clamp element 145 shown in FIG. 2). The collar body is configured to have some limited axial movement within backbone 116. For example, the collar body 120 can include a collar or shoulder 125 that can be used as a flange to provide resistance against spring 155 (see e.g. FIGS. 3 and 4), interposed between the collar body and the backbone, when the fiber stub assembly 130 is inserted in a receptacle. According to an exemplary embodiment of the present invention, collar body 120 can be formed or molded from a polymer material, although metal and other suitable materials can also be utilized. For example, collar body 120 can comprise an injection-molded, integral material.

In particular, collar body 120 includes a first end portion 121 having an opening to receive and house a fiber stub assembly 130, which includes a ferrule 132 having an optical fiber 134 secured therein. Ferrule 132 can be formed from a ceramic, glass, plastic, or metal material to support the optical fiber 134 inserted and secured therein. In a preferred aspect, ferrule 132 is a ceramic ferrule.

An optical fiber 134 is inserted through the ferrule 132, such that a first fiber stub end slightly protrudes from or is coincident or coplanar with the end face of ferrule 132. Preferably, this first fiber stub end is polished in the factory (e.g., a flat or angle-polish, with or without bevels). A second end of the fiber 134 extends part-way into the interior of the connector 100 and is utilized to splice a second optical fiber (such as optical fiber 135 shown in FIG. 13). Preferably, the second end of fiber 134 can be cleaved (flat or angled, with or without bevels). In one aspect, the second end of fiber 134 can be polished in the factory to reduce the sharpness of the edge of the fiber, which can create scrapings (debris) as it is installed in the splice element. For example, an electrical arc, such as one provided by a conventional fusion splicer machine, can be utilized to melt the tip of the fiber and form a rounded end, thereby removing the sharp edges. This electrical arc technique can be used in conjunction with polishing by an abrasive material to better control end face shape while reducing possible distortion of the core. An alternative non-contact method utilizes laser energy to ablate/melt the tip of the fiber.

Fibers 134, 135 can comprise standard single mode or multimode optical fiber, such as SMF 28 (available from Corning Inc.). In an alternative embodiment, fiber 134 additionally includes a carbon coating disposed on the outer clad of the fiber to further protect the glass-based fiber. In an exemplary aspect, fiber 134 is pre-installed and secured (e.g., by epoxy or other adhesive) in the ferrule 132, which is disposed in the first end portion 121 of collar body 120. Ferrule 132 is preferably secured within collar body portion 121 via an epoxy or other suitable adhesive. Preferably, pre-installation of the fiber stub can be performed in the factory.

Collar body 120 further includes a splice element housing portion 123. In the exemplary aspect of FIG. 2, splice element housing portion 123 provides an opening 122 in which a mechanical splice 140 can be inserted and secured in the central cavity of collar body 120. In an exemplary embodiment, mechanical splice 140 comprises a mechanical splice device (also referred to herein as a splice device or splice), such as a 3M™ FIBRLOK™ mechanical fiber optic splice device, available from 3M Company, of Saint Paul, Minn.

For example, commonly owned U.S. Pat. No. 5,159,653, incorporated herein by reference in its entirety, describes an optical fiber splice device (similar to a 3M™ FIBRLOK™ II mechanical fiber optic splice device) that includes a splice element that comprises a sheet of ductile material having a focus hinge that couples two legs, where each of the legs includes a fiber gripping channel (e.g., a V-type (or similar) groove) to optimize clamping forces for conventional glass optical fibers received therein. The ductile material, for example, can be aluminum or anodized aluminum. In addition, a conventional index matching fluid can be preloaded into the V-groove region of the splice element for improved optical connectivity within the splice element. Other conventional mechanical splice devices can also be utilized in accordance with alternative aspects of the present invention and are described in U.S. Pat. Nos. 4,824,197; 5,102,212; 5,138,681; and 5,155,787, each of which is incorporated by reference herein, in their entirety.

Mechanical splice 140 allows a field technician to splice the second end of fiber stub 130 to an optical fiber 135 (see FIG. 13) at a field installation location. The term "splice," as utilized herein, should not be construed in a limiting sense since splice 140 can allow removal of a fiber.

Figure 7:
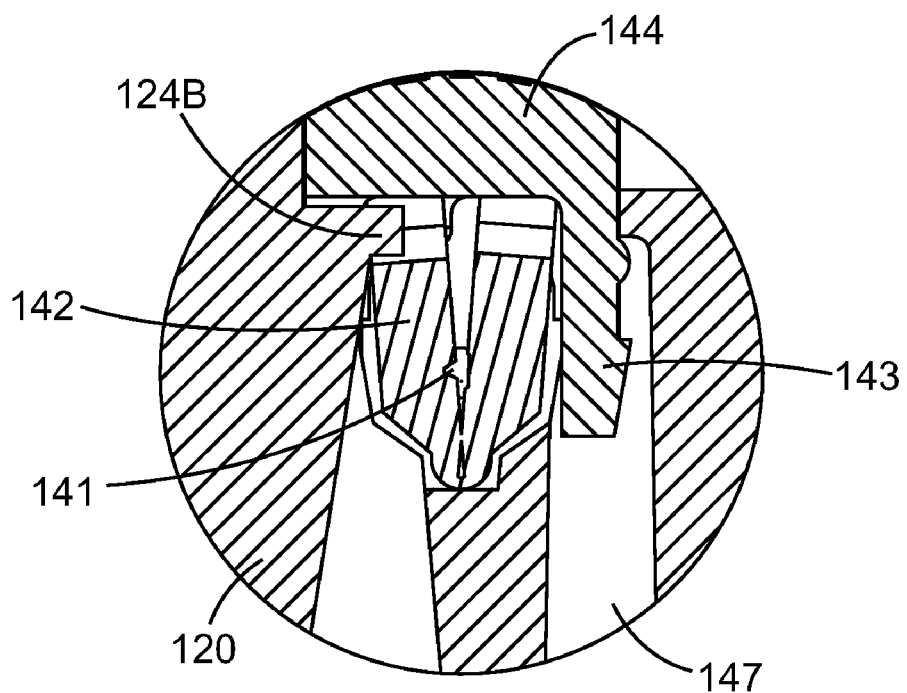
FIG. 7 is a cross section front view of an exemplary mechanical splice according to another embodiment of the present invention.

In an exemplary embodiment, utilizing a 3M™ FIBRLOK™ II mechanical fiber optic splice device, splice device 140 can include a splice element 142 and an actuating cap 144. In operation, as the cap 144 is moved from an open position to a closed position (e.g. downward in the embodiment depicted in FIG. 2), one or more cam bars located on an interior portion of the cap 144 can slide over splice element legs, urging them toward one another. Preferably, cap 144 can include a cam having a length of about 0.200". Two fiber ends, (e.g., one end of fiber 134 and one end of fiber 135) are held in place in grooves formed in the splice element and butted against each other and are spliced together in a channel, such as V-groove channel 141, (see FIG. 7) to provide sufficient optical connection, as the element legs are moved toward one another.

Alternatively, splice element housing portion 123 can be configured to allow for the removal of the splice cap if so desired. For example, as is shown in the cross section end view of FIG. 7, collar body 120 can include a slot 147 that is accessible from the side opposite the cap 144 to allow the insertion of a tool to push upwards on the splice cap leg 143. Removal of the cap 144 permits the legs of element 142 to be separated, thus permitting removal of fiber 135.

Figure 12:
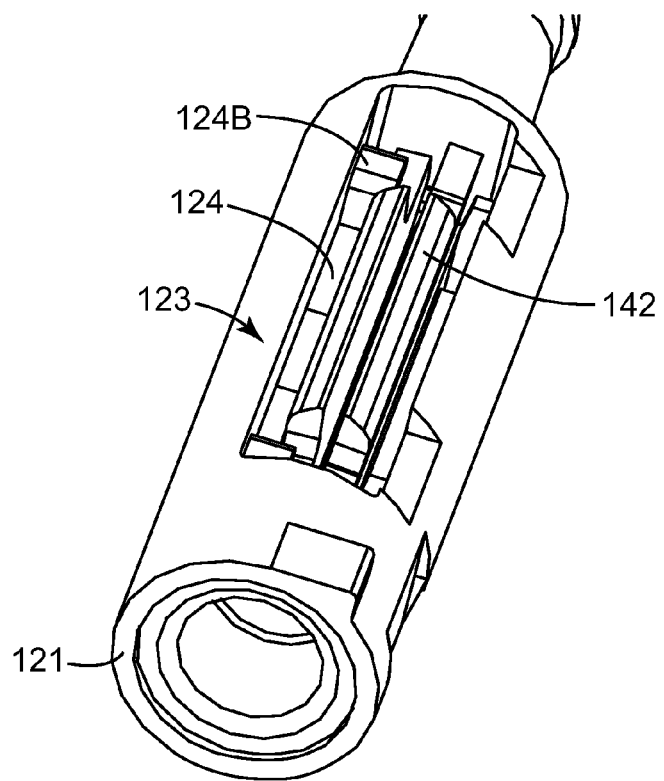
FIG. 12 is an isometric top view of collar body with a mechanical splice and cradle therein according to another embodiment of the present invention.

Splice element 142 is mountable in a mounting device or cradle 124 (partially shown in FIG. 2, and shown in top view in FIG. 12) located in portion 123 of collar body 120. In an exemplary embodiment, cradle 124 is integrally formed in collar body 120, e.g., by molding. Cradle 124 can secure (through e.g., snug or snap-fit) the axial and lateral position of the splice device 140. The mounting device 124 can be configured to hold the splice device 140 such that the splice device 140 cannot be rotated, or easily moved forward or backward once installed. As shown in the exemplary FIG. 12, the splice element 142 can be retained by clearance fit below one or more overhanging tabs 124B provided in portion 123. The element receiving cradle 124 is configured to allow the splice element 142 to be inserted when tilted away from the retaining tabs. Once the splice element 142 is fully seated, it is then tilted toward the tabs which brings a portion of the element 142 under the tabs to retain it in a vertical direction. The cap 144 can then be placed over the element 142, as the legs of the cap 144 can extend along the sides of the element 142 and prevent the element from tilting away from the retaining tabs (also see FIG. 7 for a cross section view of an overhanging tab 124B and the retention of leg 143 of the cap 144).

Further, collar body 120 includes a buffer clamping portion 126 that can be configured, e.g., by having at least one slot or opening 128, to receive a buffer clamping mechanism, such as a buffer clamp element 145. In an exemplary aspect, the buffer clamping portion 126 is disposed within the interior of the backbone 116 in the fully assembled connector.

Figure 6:
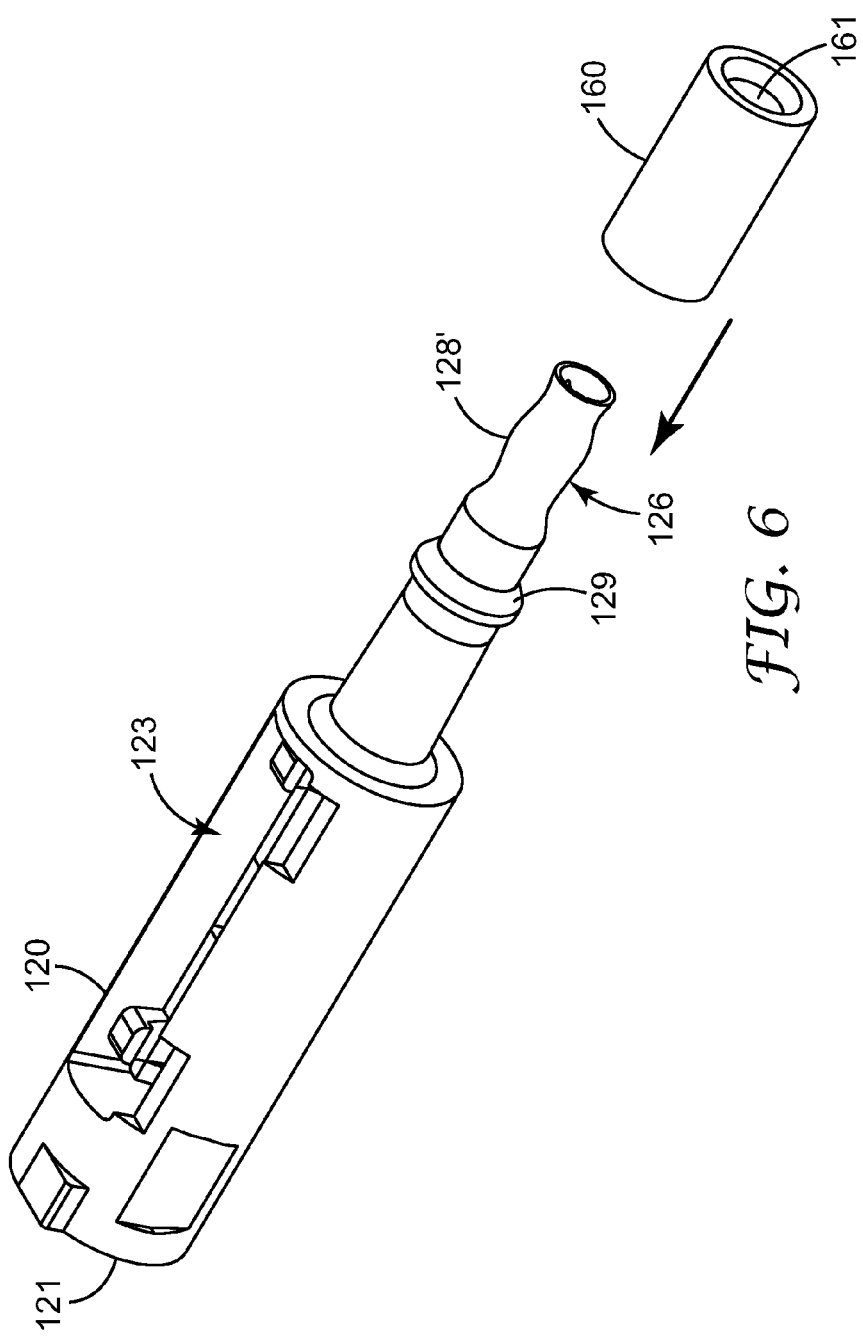
FIG. 6 is an isometric view of an alternative collar body according to another embodiment of the present invention.
Figure 10:
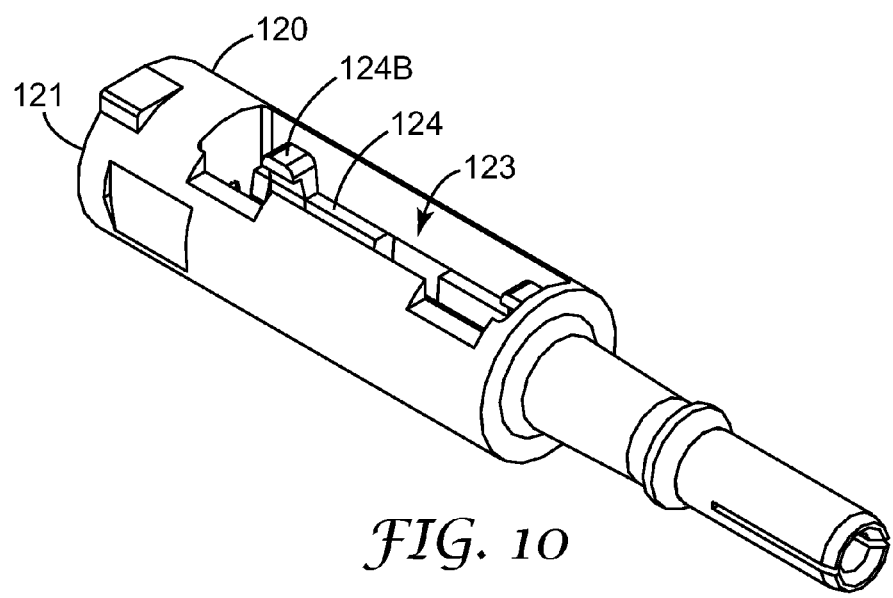
FIG. 10 is an isometric view of an alternative collar body according to another embodiment of the present invention.
Figure 11:
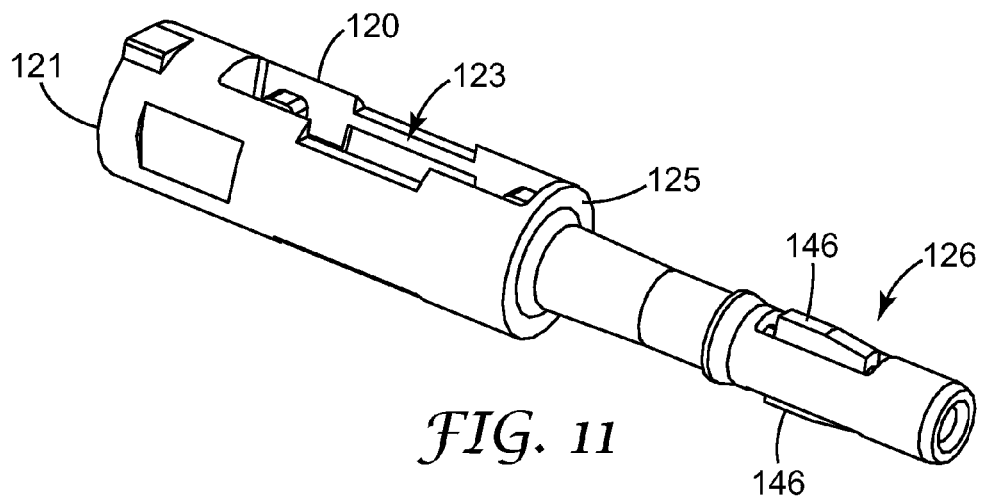
FIG. 11 is an isometric view of a collar body and a buffer clamp inserted therein according to another embodiment of the present invention.

Alternatively, buffer clamping portion 126 can be configured to include a buffer clamp as an integral part of its structure. For example, FIG. 6 shows buffer clamping portion 126 as having a tapered or ridged outer surface 128'. A further alternative buffer clamping configuration is shown in FIG. 10, where buffer clamping portion 126 includes one or more longitudinally formed slots, resulting in a collet-like shape. In a further alternative embodiment, as shown in FIG. 11, the buffer clamp can be configured as a dual tab structure 146 that can be compressed (either elastically or in-elastically) onto the buffer cladding of the optical fiber upon actuation, such as by sleeve 160 described below. Dual tabs 146 can be integrally formed (e.g., by molding) with the buffer clamping portion 126. Dual tabs 146 are raised with respect to the outer surface of the buffer clamping portion 126, and can be attached at one or both ends through reduced cross-section regions. In addition, the inner surface of the buffer clamping portion can be formed to include ridges or shaped-barbs (not shown) as a one-way catch to allow fiber insertion and resist fiber removal.

Figure 5:
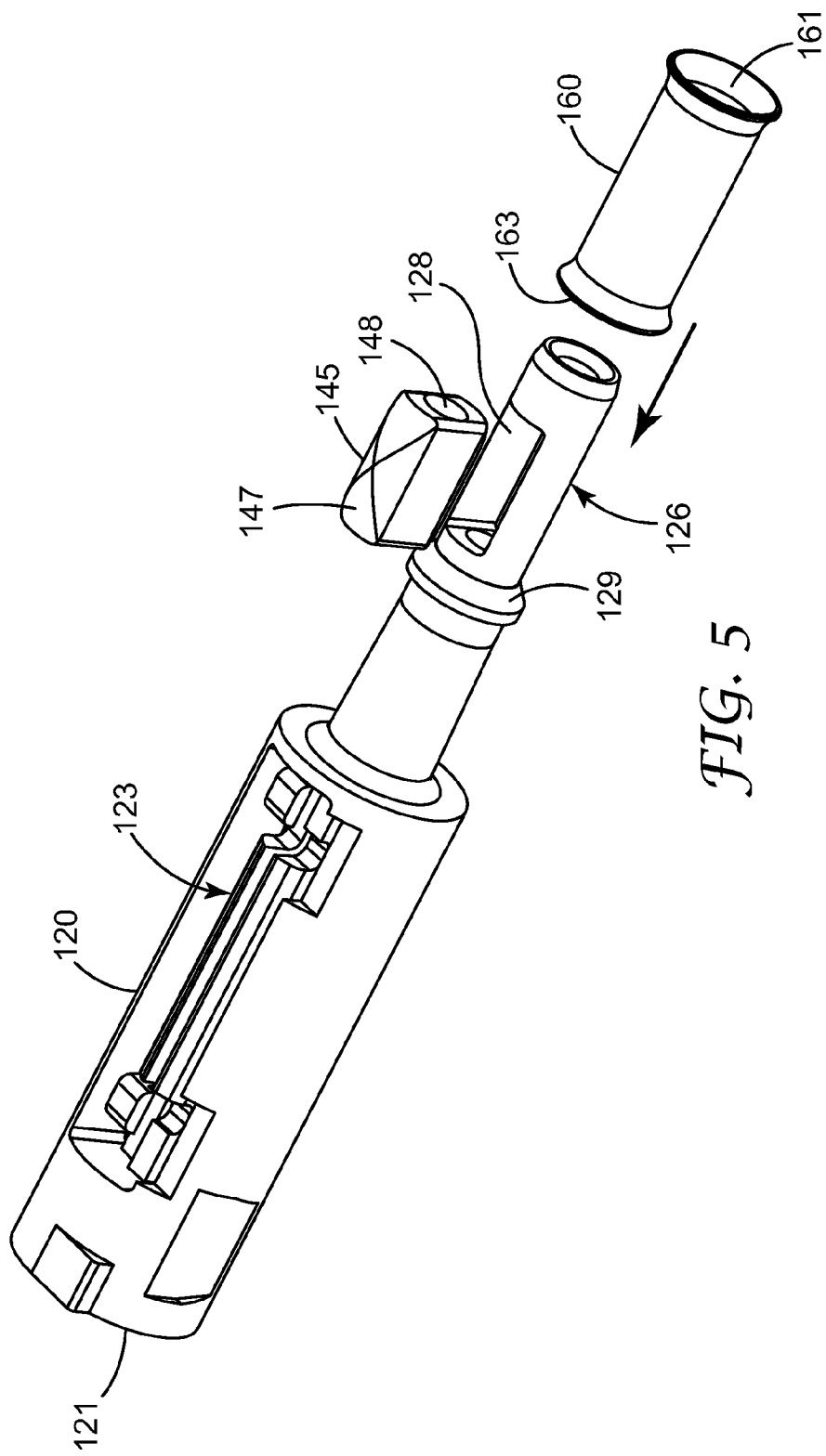
FIG. 5 is an isometric view of a collar body according to another embodiment of the present invention.

According to an exemplary aspect, buffer clamping portion 126 can receive a buffer clamping element 145 that is configured to clamp a standard optical fiber buffer cladding, such as a 900 μm outer diameter buffer cladding, a 250 μm buffer cladding, or a fiber buffer cladding having an outer diameter being larger or smaller. As is shown in FIG. 5, buffer clamping element 145 can include a through-hole 148 to receive an optical fiber buffer cladding. Element 145 is further configured to have one or more raised surface features 147. Buffer clamping element 145 is preferably configured to be received in buffer clamping portion 126, such that the raised surfaces extend out from the outer surface of portion 126. Element 145 can be formed from a material such as polypropylene or the like.

To activate the particular buffer clamping element 145, connector 100 further includes an actuation sleeve 160 having an opening 161 extending therethrough that is axially slidably received by the outer surface of buffer clamping portion 126. Sleeve 160 can be formed from a polymer or metal material. Preferably, the hardness of the sleeve 160 is greater than the hardness of the material forming the buffer clamping portion 126. When sleeve 160 is axially moved in the direction of the arrow shown in FIG. 5, first end 163 contacts surface features 147 of buffer clamping element 145. In the exemplary aspect of FIG. 5, first end 163 is generally funnel-shaped. As sleeve 160 is further axially moved, the inner surface of sleeve 160 further forces the surface features 147 inward, causing the interior walls of through-hole 148 to collapse onto and clamp the buffer coating of fiber 135 (see also FIG. 4, after actuation sleeve 160 is fully positioned over buffer clamping portion 126).

In an alternative embodiment, as shown in FIG. 6, buffer clamping portion 126 can include a tapered or ridged outer surface 128'. As shown in FIG. 6, prior to actuation of the buffer clamp, a portion of sleeve 160 is disposed on the outer surface of buffer clamp portion 126. During actuation, the inner surface of sleeve 160 displaces the ridged outer surface 128' inward, causing the interior walls of portion 126 to collapse onto and clamp the buffer coating of fiber 135. In an exemplary aspect, the axial movement of sleeve 160 can be stopped by flange 129 (see FIG. 5). In addition, the interior channel of collar body 120 can include a fiber guiding portion 127 disposed near the interface with the splice element housing portion 123 (see FIG. 3).

Figure 8:
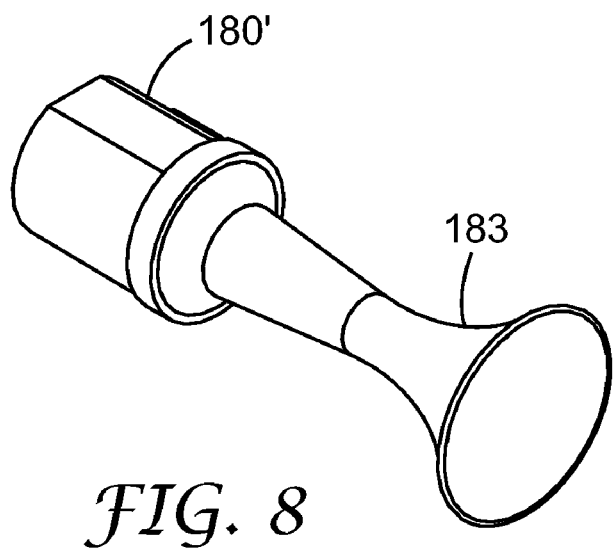
FIG. 8 is an isometric view of an exemplary boot according to another embodiment of the present invention.
Figure 9:
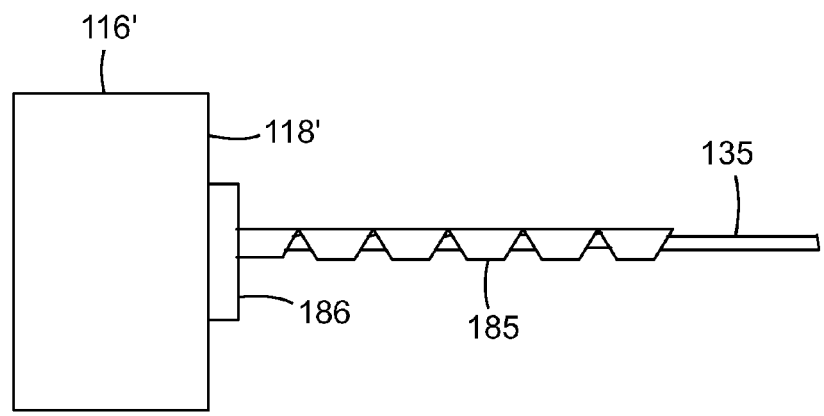
FIG. 9 is a side view of an exemplary boot according to an alternative embodiment of the present invention.

To prevent sharp fiber bends at the connector/fiber interface, a boot 180 can be utilized. In an exemplary aspect, boot 180 includes a conventional tapered tail 182. In an alternative aspect, as shown in FIG. 8, boot 180 can include a funnel-shaped tail section 183, which provides a fiber guide to the field technician terminating the fiber and to also provide control of the minimum bend radius to prevent possible signal losses when the fiber is side-loaded. In a further alternative configuration, as shown in FIG. 9, the boot can include a hinged/segmented tail section 185, which can provide some bending but at a modest bend radius. In addition, the boot can be coupled to a back surface 118' of backbone 116' via a rotatable mount 186. In a further alternative aspect (not shown), the boot can be formed from more than one material to provide a desired bend radius.

Figure 27A:
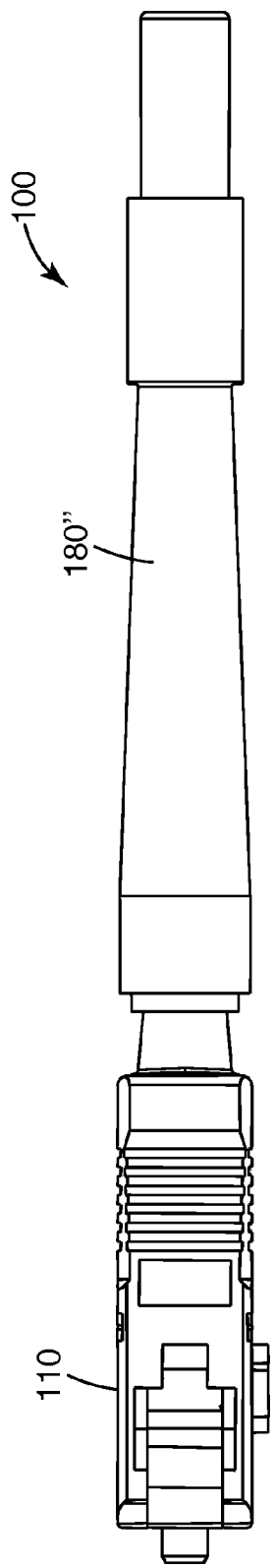
FIGS. 27A and 27B show a side view and a cross-section view, respectively, of an exemplary boot according to an alternative embodiment of the present invention.
Figure 27B:
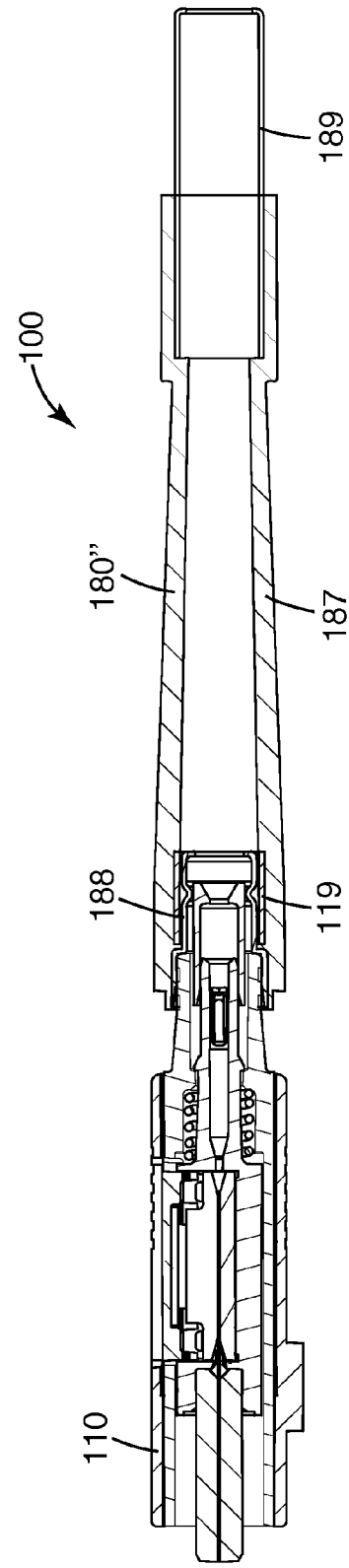

In yet a further alternative configuration, the boot can further provide axial strain relief. For example, as shown in FIGS. 27A and 27B, a boot 180" can include a cable crimp ring 119 to crimp the strength member(s) of the fiber cable on to the connector 100 having a housing 110 (such as is described above). In this alternative embodiment, the connector can further include an adapter ring 188, which is adapted to fit over the backbone 118 of the connector 100.

The cable crimp ring 119 can be adapted to slide over at least a portion of adapter ring 188. The adapter ring 188 can be installed in the factory to retain the sleeve 160 in place during shipment. The adapter ring 188 can also reduce/prevent damage to the backbone 118 of the connector 100 during crimping of the strength member(s) with crimp ring 119. In addition, boot 180" can include an outer jacket 187 comprising a polymer material and a cable jacket crimp ring 189, which is configured to directly crimp onto the outer jacket of the fiber cable and to further reduce potential axial strain and axial movement of the fiber components therein. The outer jacket 187 is preferably configured to couple to the backbone of connector 100 and cover at least a portion of jacket crimp ring 189. An exemplary fiber cable utilized in this embodiment comprises a 3.5 mm jacketed drop cable, commercially available from, e.g., Samsung, Hwabaek, Cosmolink, and Mercury (all of Korea). This construction can provide straightforward field termination onto the outer cable jacket and the strength member(s) (e.g., Kevlar or polyester yarn) of the drop cable. This construction can also provide a connector termination capable of surviving rougher handling and greater pull forces.

The exemplary connector shown in FIGS. 1-4 can provide for straightforward field fiber termination for 250 µm, 900 µm, or non-standard buffer coated optical fiber, without the need for a power source, adhesive, costly installation tools, or field polishing. The exemplary connector can have an overall length of less than two inches. In addition, the connector includes both an integral splice and a buffer clamp internal to the connector backbone.

In another exemplary aspect, a field termination procedure and field termination platform are provided. The field termination procedure and field termination platform are described with reference to FIG. 13. For example, an assembled connector body 101, similar to that described above, is provided with a factory installed, polished fiber stub. In contrast, conventional field terminated connectors often include multiple, separate small components that must be assembled in the field, often in an uncontrolled environment. Conventional field termination procedures often require the mixing of adhesive and polishing the fiber end face, which can be time consuming and can require a higher degree of skill to achieve acceptable optical performance. Further, such field polishing cannot be pre-checked for optical performance by the connector. In the exemplary embodiments described above, the fiber stub connector does not require application of an adhesive in the field or polishing of the fiber at the ferrule end face.

In this exemplary embodiment, connector body 101 is coupled to a field termination platform 200 that is configured to allow the field technician to perform multiple termination steps in a single, integrated device. The exemplary termination platform can be fitted with one or more fiber guide sections to allow easy and reliable alignment and insertion of the fiber into the connector. The fiber guides can also provide positive positioning of the very small fiber end without the need for visual aids or good lighting conditions. An alternative field termination platform 300 is described with respect to FIGS. 14-23.

For example, field termination platform 200 can include a base 210 that can include one or more sections, such as connector mounting section 211, splice actuation section 212, and fiber alignment section 213. In a preferred aspect, connector body 101 is coupled to connector mounting section 211, the splice actuation tool 240 is disposed on splice actuation section 212, and a fiber guide structure 230 is disposed on fiber alignment section 213. In a preferred aspect, at least one of sections 211, 212, and 213 is movable with respect to the other sections.

Fiber alignment section 213 can provide preliminary alignment and clamping means for the fiber. This section can be used to position the fiber end at the correct distance for insertion into the connector body 101, and to provide a proper bow/end load. Splice actuation section 212 can also contain a second fiber guide structure that engages and guides the free end of the fiber as section 212 is moved toward section 213. This guide can be used to provide close alignment of the fiber to the center of the connector. Connector mounting section 211 can also contain a third fiber guide structure which may or may not be moveable to provide clearance to the other mechanisms present as required. This guide structure can closely align the fiber to the entrance of the collar neck (i.e., the end of the buffer clamping portion furthest from the front face of the connector body) and can maintain guidance until the fiber is within the collar neck. Once the fiber is positioned within the collar neck, the mechanism may be moved to a clearance position to allow actuation of the clamp devices.

Fiber 135 can be inserted through boot 180', disposed on the fiber alignment section of platform base, and coupled to one end of alignment groove 230. In a preferred aspect, boot 180 includes a funnel-shaped tail section which provides a more straightforward feed-through of optical fiber 135. The fiber 135 can be further fed through alignment groove 230, which keeps the fiber axially positioned and restricts lateral displacement as the fiber 135 is further inserted into the connector body 101.

In one aspect, prior to insertion of the fiber 135 into connector body 101, in an example field termination, optical fiber 135 is prepared by stripping and cleaving (flat or angled) to match the orientation of the pre-installed fiber stub. For example, a commercial fiber cleaver such as an Ilsintech MAX CI-08, available from Fujikura, Japan (not shown) can be utilized to provide an angled cleave. No polishing of the fiber end is required, as a cleaved fiber can be optically coupled to the fiber stub 134 in splice 140. Alternatively, fiber 135 can be prepared after insertion of the fiber through boot 180.

The fiber 135 is continually fed through until the fiber end contacts the fiber stub in the mechanical splice of the connector body 101. The axial position of the end of fiber 135 can be further maintained by clamping the fiber 135 with fiber clamp 190, preferably disposed on fiber alignment section 213. The arrangement of sections 211, 212 and 213 can be such that as they are coupled together to a fully engaged position, the end of fiber 135 is made to contact the stub fiber end within the splice element, and the fiber is thus end-loaded sufficiently to produce a desired bow in the fiber span from the splice element in the connector to the clamp device on section 213. This ensures proper end-loading of the splice during actuation of the buffer clamp and splice. A bowing of fiber 135 outside the mechanical splice can indicate proper contact.

The splice within connector body 101 can be actuated by utilizing an actuation mechanism 240, which may be integrally formed on splice actuation section 212 of platform 200. In a preferred aspect, the actuation mechanism provides actuation of both the fiber splice element and the buffer clamping mechanism within the same operation as performed by the field technician. In an alternative aspect, actuation mechanism 240 can be formed as a separate element that is removably attachable to splice actuation section 212.

Figure 13:
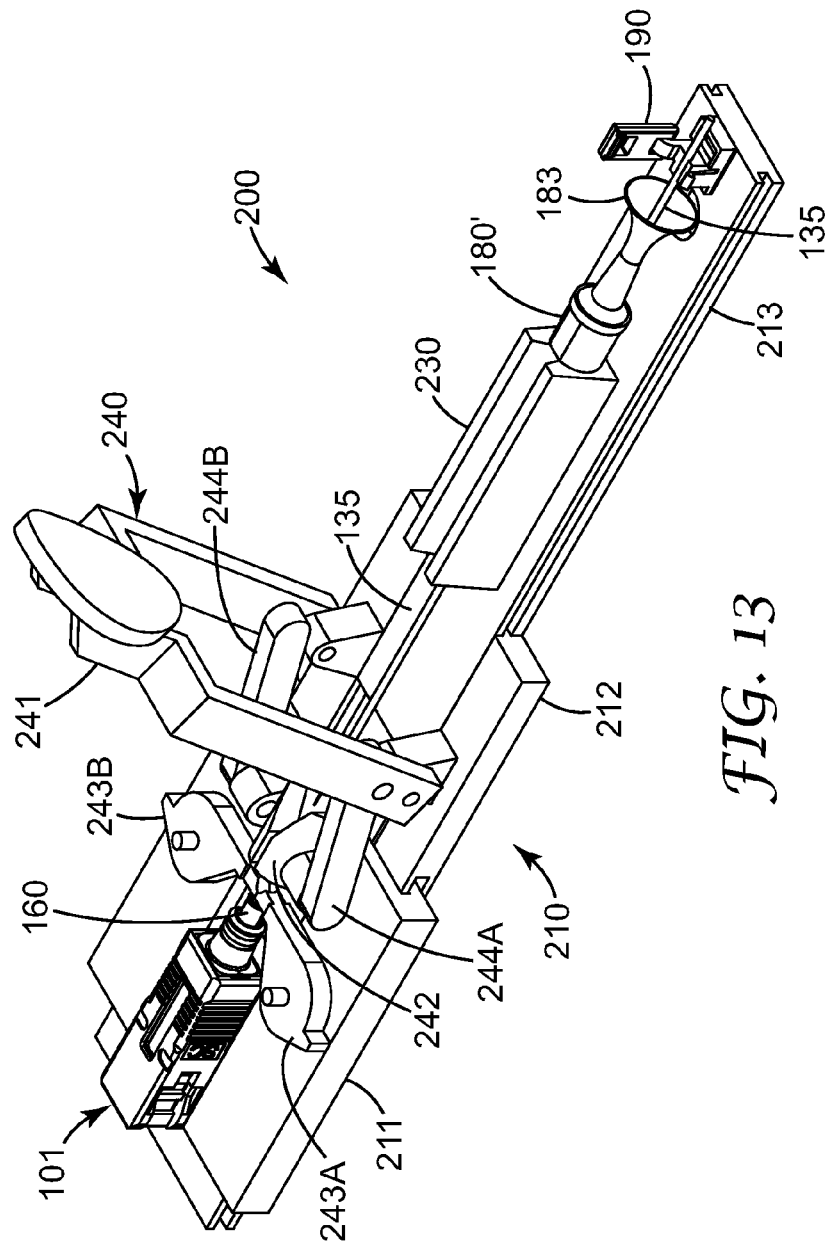
FIG. 13 is an isometric view of a field termination platform according to another embodiment of the present invention.
Figure 14:
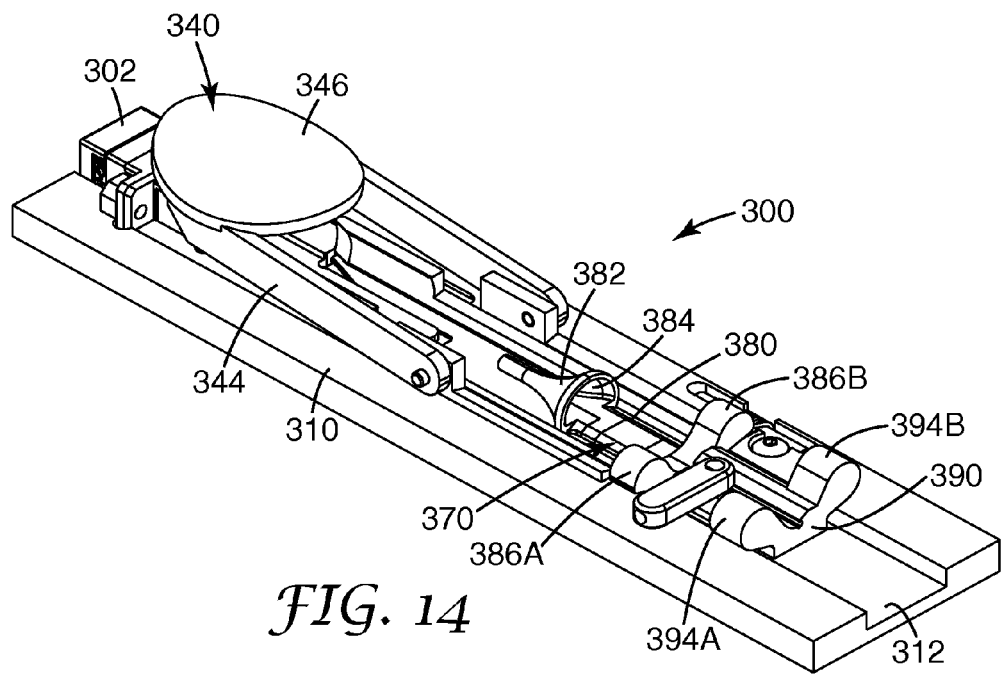
FIG. 14 is an isometric view of another field termination platform according to an alternative embodiment of the present invention.

For example, actuation mechanism 240 includes a cap actuator or driver 241 that is configured to contact and press against the splice cap, such as splice cap 144, of the mechanical splice. As shown in FIG. 13, a forward pressing movement can be applied to cap actuator or driver 241 to displace the driver 241 towards the cap in an arcing motion, until contact is made to actuate the mechanical splice. In addition, this movement can also be used to initiate actuation of the buffer clamp sleeve of the connector body 101. For example, actuation mechanism 240 can further comprise a buffer clamping actuator 242. In this exemplary configuration, buffer clamping actuator 242 includes lever arms 244A and 244B that are configured to contact pivoting arms 243A and 243B. Pivoting arms 243A and 243B contact sleeve 160 of the connector body. As cap 241 is moved forward, buffer clamping actuator 242 axially pushes sleeve 160 forward over the buffer clamping portion of the connector body 101. In alternative embodiments, the buffer clamp can be actuated before, at the same time as, or after the actuation of the mechanical splice.

After the splice is actuated, fiber clamp 190 can be released, and boot 180' can be coupled to the back end of the connector body 101. The connector body 101 can be released from platform 200 and can be ready for use.

Thus, in an exemplary embodiment, field termination platform 200 can be configured to provide a field technician with a single device to terminate a prepared optical fiber with a standard format optical connector. Preferably, the fiber clamp 190, the fiber alignment guide 230, the actuation device 240, and the connector body 101 are provided to the field technician as a single platform package. After fiber stripping and cleaving and fiber feed-through, the technician need only align the end of the fiber tip to a specified location relative to the fiber alignment section 213 of the platform, clamp the rear portion of fiber 135 with clamp 190 and actuate the splice using the actuation device 240. The only "assembly" would be the coupling of the boot 180/180' to the connector body 101.

An alternative field termination platform or tool 300 is shown with respect to FIGS. 14-22. With this alternative field termination platform, the terminated optical fiber can be securely held in a part of the tool during fiber end preparation. In addition, the tool provides for repeatable, accurate fiber insertion in the optical connector. Moreover, the field termination platform of this alternative embodiment allows the field technician to utilize a fully assembled connector during termination.

Platform 300 includes a base portion 310 having a guide channel 312 formed therein. Platform 300 further includes a connector holder 302 that is configured to receive and secure an optical connector, such as connector 100, shown in FIG. 17, during the fiber termination procedure. Platform 300 can further include an actuation mechanism 340 that includes a cap actuator or driver 346 that is configured to contact and press against the splice cap of the connector, such as splice cap 144, of the mechanical splice (see FIG. 20). For example, a pressing movement can be applied to cap actuator or driver 346 to displace the driver towards the cap until contact is made to actuate the mechanical splice. The driver 346 can be coupled to base 310 via levers 344.

In addition, platform 300 includes a fiber holder assembly 370 that includes a fiber holder assembly base 372. In a preferred aspect of this embodiment, the fiber holder assembly base 372 is configured to be slidably received in channel 312 of the platform base 310. In addition, the fiber holder assembly base 372 further includes its own channel or slot 371 formed therein.

Figure 15:
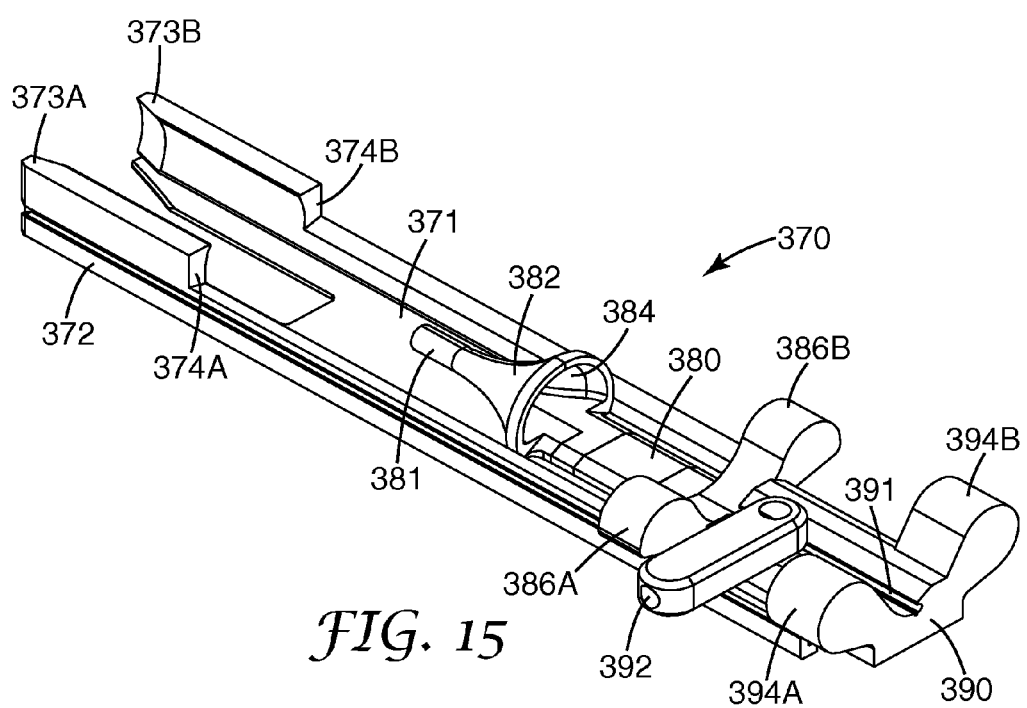
FIG. 15 is an isometric view of a fiber holder assembly according to an alternative embodiment of the present invention.

As shown in FIG. 15, fiber holder assembly 370 includes a buffer clamp actuator 380 and a fiber holder portion 390, both of which are slidably received in the slot or channel 371 of the fiber holder assembly base 372. Fiber holder portion 390 can be secured in slot 371 via a fastener, such as a set screw or pin (not shown). According to an exemplary aspect of this embodiment, platform base 310, fiber holder assembly 370, and components thereof, can be formed or molded from a polymer material, although metal and other suitably rigid materials can also be utilized.

The fiber holder assembly base 372 further includes stops 374A and 374B that are configured to stop the forward sliding motion of buffer clamp actuator 380, for example, by contacting buffer clamp handles 386A and 386B (See e.g., FIG. 18B below). In addition, fiber holder assembly base 372 further includes stops 373A and 373B that can be configured to be received in and engage with a conventional fiber cleaver. Thus the fiber can be kept in the same tool before and after fiber end preparation.

Figure 22:
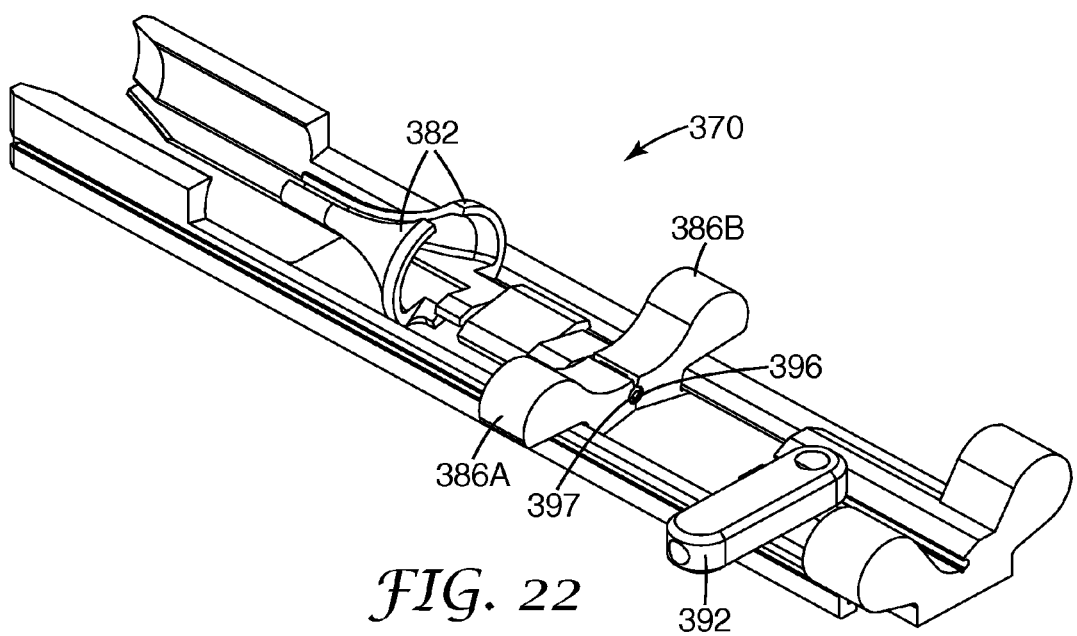
FIG. 22 is an isometric view of a field termination platform having a buffer clamp actuator in an open position according to another embodiment of the present invention.

Buffer clamp actuator 380 is configured to engage or otherwise actuate a buffer clamp sleeve, such as buffer clamp sleeve 160 (see e.g., FIG. 20). For example, buffer clamp actuator 380 can include a funnel-shaped opening 382 and a tip portion 381 configured to contact sleeve 160, or a portion thereof. The funnel shaped portion provides a guide for a fiber, such as an optical fiber 135 to be inserted therethrough (see FIGS. 18A and 18B). Buffer clamp actuator 380 can further include handles or lobes 386A and 386B that provide accessible contact points for a user to slide the buffer clamp actuator during fiber termination. Buffer clamp actuator 380 can be formed as a two piece construction, having an open position (as shown in FIG. 22) or a closed position (see FIG. 14). For example, the buffer clamp actuator can be held in the closed position via spring action, such as with pivot shaft 396 and spring 397. The buffer clamp actuator 380 can be placed in the open position through the application of modest opposing forces on lobes 386A and 386B.

Figure 18A:
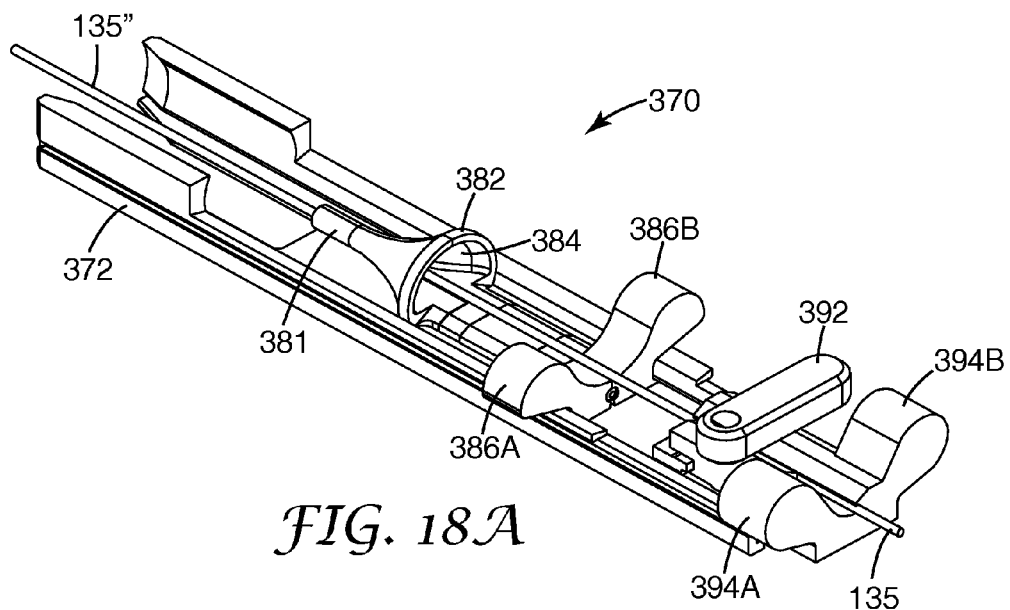
FIGS. 18A and 18B are isometric views of the fiber holder assembly according to an alternative embodiment of the present invention.

As mentioned above, fiber holder assembly 370 can further include a fiber holder portion 390, slidably inserted therein. The fiber holder portion 390 includes a fiber guide 391 to guide a fiber to be terminated. A clamp 392, such as an eccentric clamp, shown in an open position in FIG. 14, can be used to hold the fiber in guide 391 during termination when placed in a closed position, such as shown in FIGS. 18A and 18B. Using this configuration, even fibers with high bending (due to spooling) can be gripped and guided by this platform in a straightforward manner.

Figure 16:
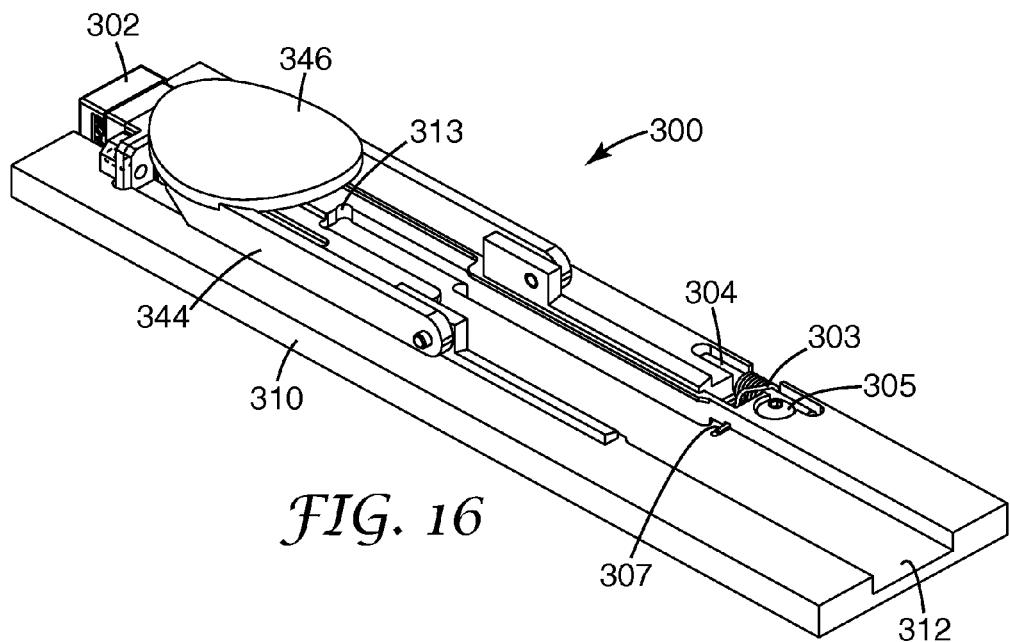
FIG. 16 is an isometric view of the base portion of the field termination platform according to an alternative embodiment of the present invention.

Referring to FIG. 16, fiber platform base 310 further includes a latch spring mechanism to engage the fiber holder assembly 370 and secure its position. For example, fiber platform base 310 can further include a latch spring 303 secured in base 310 via a spring shaft 304. Latch spring 303 includes an extension or detent 307 configured to catch against a portion of fiber holder assembly base 372. A set screw or pin 305 can be used to hold spring shaft 304 in place.

In practice, a fiber termination process can utilize the platform 300 to terminate an optical fiber in the field to an optical connector 100 in a straightforward manner. In addition, the field technician can utilize an optical connector that is fully assembled in the factory, such that additional connector assembly is not necessary in the field.

Figure 17:
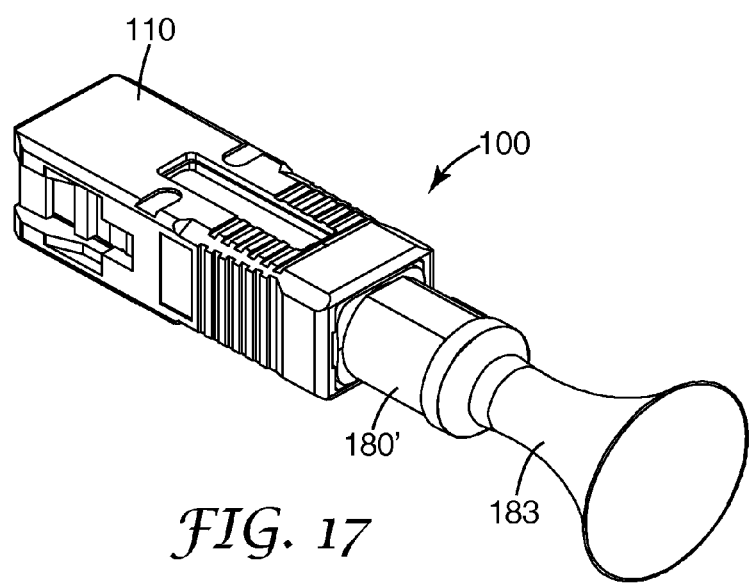
FIG. 17 is an isometric view of an optical connector according to another embodiment of the present invention.

Referring to FIGS. 18A, 18B, and 19-22, for example, a technician can remove the fiber holder assembly 370 from the platform by releasing the latch spring mechanism, such that the fiber holder assembly can slide along channel 312 of platform base 310. The splice element actuation mechanism 340 can be raised, allowing the technician to install connector 100 in connector coupling or holder 302 (see e.g. FIG. 19), e.g., by a snap fit. In this example, a connector 100 such as shown in FIG. 17 is utilized having a boot 180' that includes a funnel-shaped tail section 183, pre-mounted on the optical connector. After connector mounting, the splice actuation mechanism 340 can be returned to a position just above the splice cap 144.

Figure 18B:
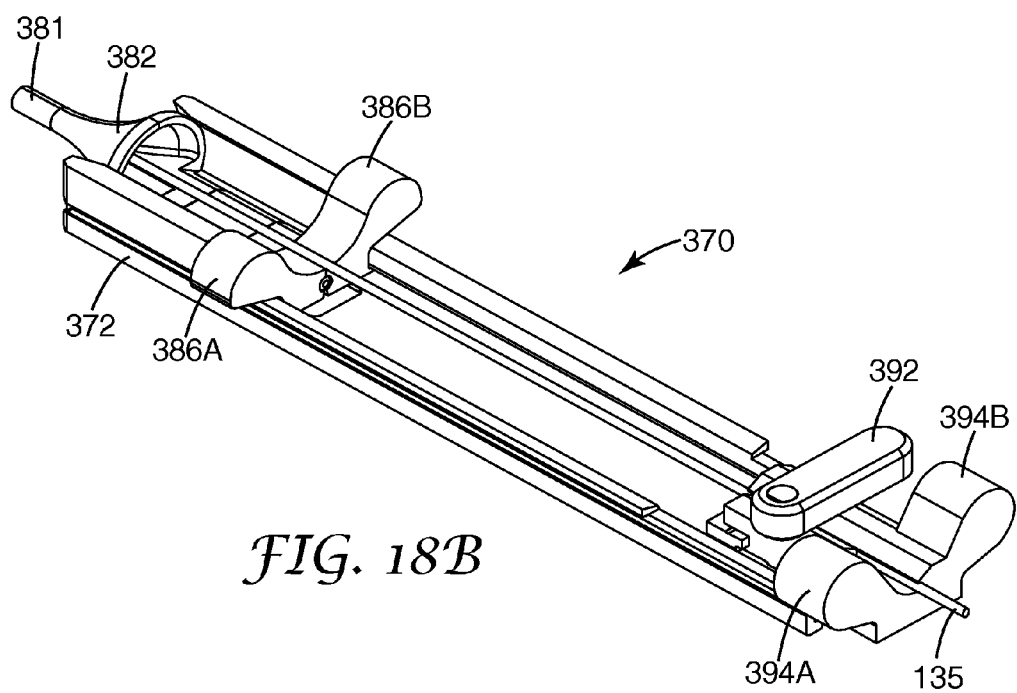
Figure 21:
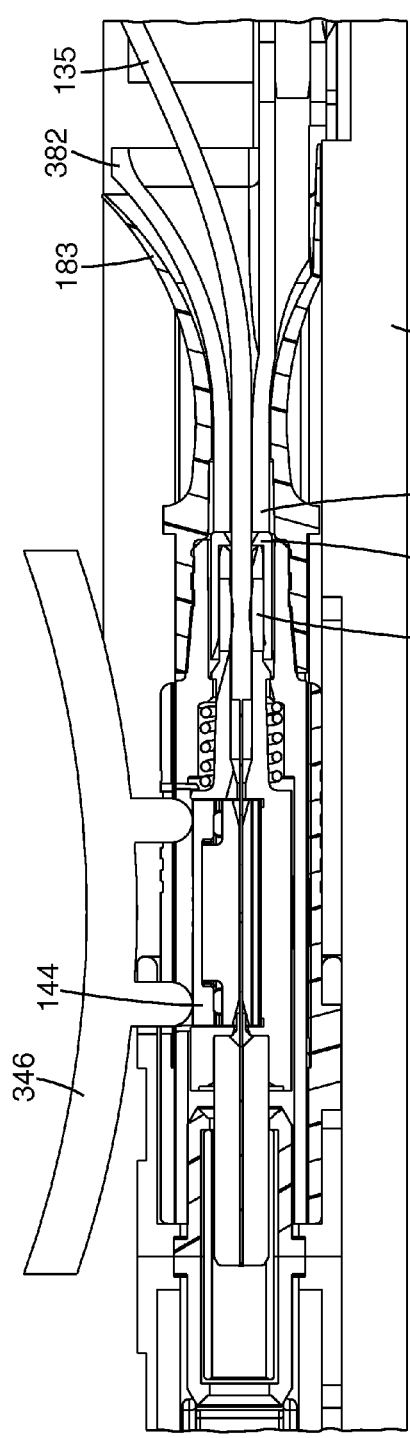
FIG. 21 is another cross section view of a field termination platform having a fiber being installed therein according to an alternative embodiment of the present invention.

The optical fiber being terminated, such as fiber 135 shown in FIGS. 18A and 18B, can be installed in the fiber holder assembly by threading the fiber through the funnel portion 382 of buffer clamp actuator 380. The fiber 135 can be held in place by engaging fiber clamp 392 and placing it in a closed position. The clamp 392 is configured to clamp a standard optical fiber outer jacket, such as a conventional fiber having 900 μm buffer sleeve or a 250 μm buffer sleeve.

Optical fiber 135 is prepared by stripping and cleaving (flat or angled) to match the orientation of the pre-installed fiber stub of the optical connector. In a preferred aspect, for fiber end preparation, a portion 135" of the fiber can extend by a suitable amount, for example about 40 mm to 50 mm, beyond the end of the fiber holder assembly. The buffer clamp actuator 380 can be spaced from holder 390 along slot or channel 371 by a suitable amount (such as shown in FIG. 18A, to provide fiber support during stripping and cleaving. The fiber jacket/plastic coating can be stripped using a conventional mechanical fiber stripper. A small amount of plastic coating can extend beyond the end of assembly 370. The glass portion of the fiber can be wiped clean. Cleaving, using a conventional cleaver, such as described above, can be performed as the fiber is held in place in the fiber clamp assembly.

As shown in FIG. 18B, after the fiber end is prepared, the buffer clamp actuator 380 can be moved forward along slot 371 such that the tip 381 is approximately even with the tip of the optical fiber. The positioning can protect the prepared fiber end during this portion of the termination procedure. In addition, this positioning allows initial insertion of the fiber end into the connector back end without having to visually locate the fiber tip, as the tip of the buffer clamp actuator can be used as a visual proxy.

The fiber holder assembly 370, with the prepared fiber held therein, can be inserted in channel 312 of the platform base 310 so that the latching spring 303 is engaged. As is shown in cross section view in FIG. 19, the fiber holder assembly can be moved forward (i.e., towards the mounted connector) by applying modest force to handles 394A and 394B. As the tip portion 381 contacts the sleeve 160 of connector 100, buffer clamp actuator 380 stops moving, but fiber holder 390 continues pushing the prepared fiber end forward into the splice element 142 (see FIG. 20) of the connector. The prepared fiber end of fiber 135 then contacts the prepared end of the fiber stub 134. The fiber 135 begins to bow, as shown in FIG. 19, where bowed fiber 135A provides a visual indication to the technician that fiber end contact has occurred. In a preferred aspect, as the fiber bows, the detent 307 of the spring latch mechanism can be configured to catch a potion of assembly 370 and stop further movement. Thus, a fiber bow is retained through splice and buffer clamp actuation.

Figure 23:
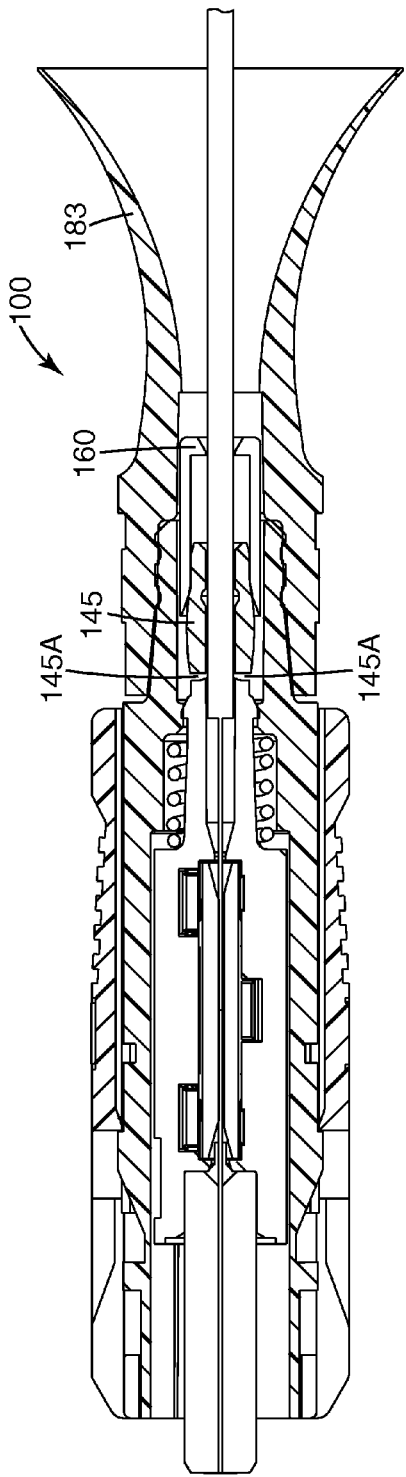
FIG. 23 is a cross section view of an optical connector having an alternative buffer clamping element configuration according to another embodiment of the present invention.

After fiber contact has been made creating a butt coupling of fibers 134 and 135, the splice actuation mechanism 346 can be pressed downward onto cap 144 to actuate the splice element 142. After actuation of the splice element, the buffer clamp can be actuated. For example, further force can be applied to handles or lobes 386A and 386B, forcing actuator tip 381 to push sleeve 160 over the buffer clamp mechanism 145 (see FIG. 21). According to a preferred aspect, as shown in FIG. 23, the buffer clamping mechanism 145 can be configured to include two or more cantilevered clamp elements, such as wedge or teeth shaped pieces 145A, that can clamp onto the fiber buffer upon actuation by sleeve 160. These clamping elements 145A can have a fixed end and a free end. The fixed end of the clamping element is preferably located at the rear end of the connector collar, such as shown in FIG. 23. When the sleeve 160 is moved over the buffer clamp mechanism, the free ends 145A of the clamp elements deflect inward, pivoting from the fixed end to bite into the buffer coating of the fiber 135 to hold it securely in place.

Upon buffer clamp actuation, the terminated connector is complete. The fiber clamp 392 can be returned to the open position, releasing the fiber bow. In addition, the buffer clamp actuator 380 can be placed in an open position to release the terminated fiber by disengaging spring latch 107, as is shown in FIG. 22.

Optionally, the mount or coupling 302 can be further configured to couple a detector or light source to test the quality of the terminated optical connector. Further, a user can set up a light source detector system to monitor signal loss during termination. The actuation driver 346 can be raised and the terminated connector can then be removed from mount or coupling 302. The connector can then be utilized as desired by the user.

Thus, according to this alternative embodiment, a complete tool or platform can be provided to allow field termination of an optical fiber without the need to perform field polishing or use epoxies. In addition, the tool or platform is reusable. Using this configuration, even fibers with high bending (due to spooling) can be gripped and guided by this platform in a straightforward manner. The connector can be pre-assembled in the factory, even with a pre assembled boot. The buffer clamp actuator mechanism can also be utilized to protect the fiber during initial insertion into the optical connector.

Figure 24:
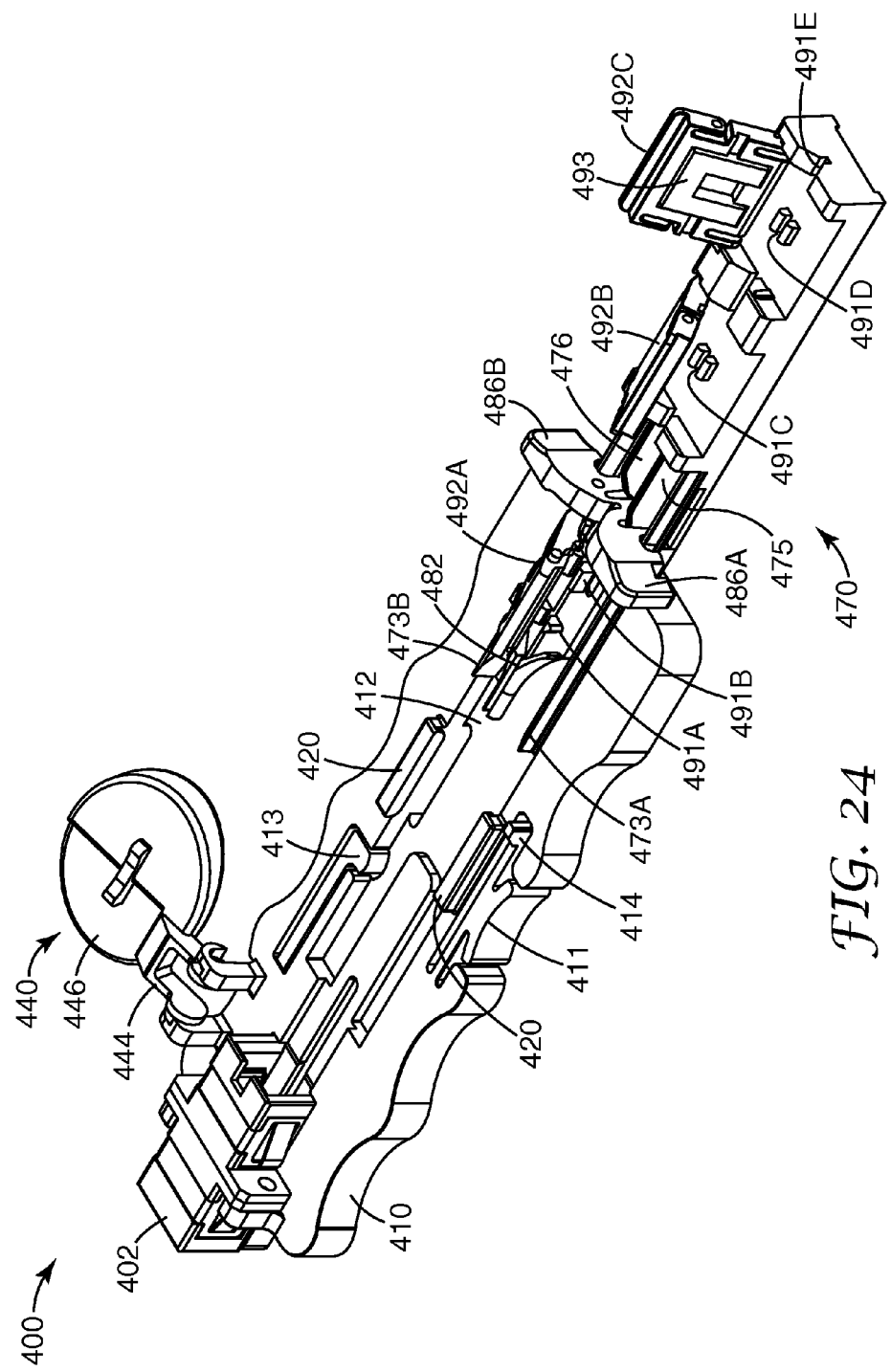
FIG. 24 is an isometric view of another field termination platform according to an alternative embodiment of the present invention.
Figure 25:
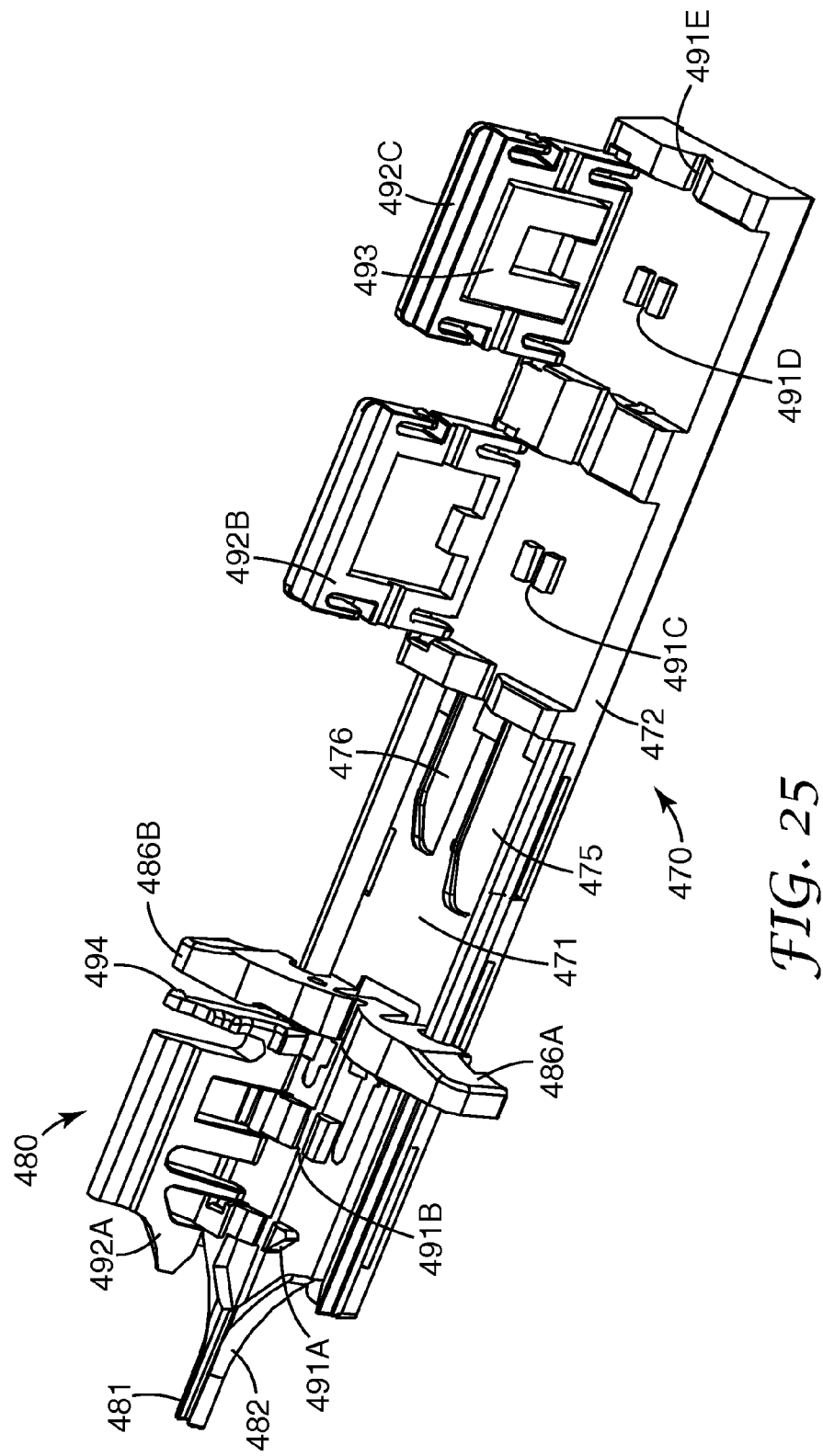
FIG. 25 is an isometric view of the field termination platform of FIG. 24 having a buffer clamp actuator in an open position according to an alternative embodiment of the present invention.
Figure 26:
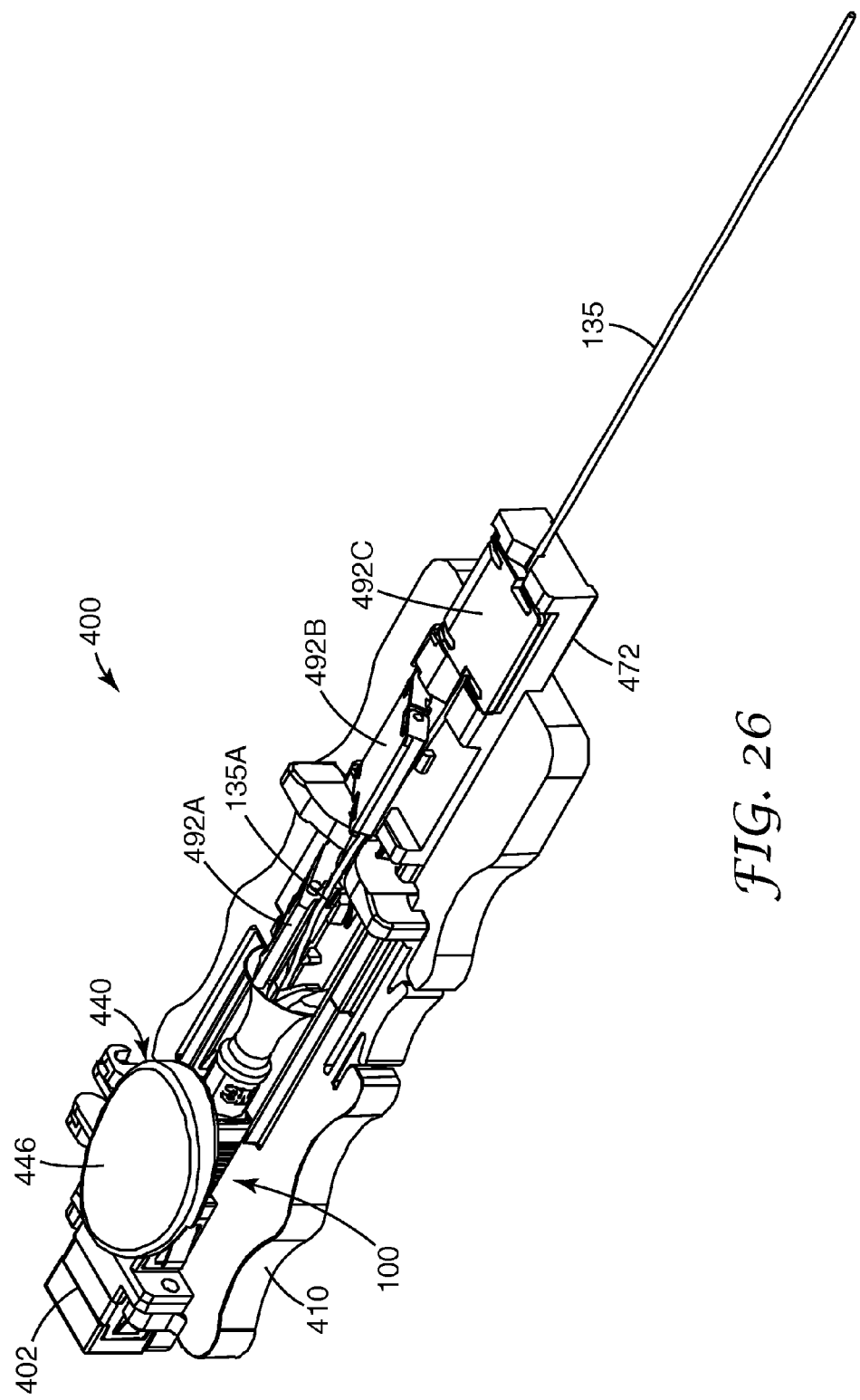
FIG. 26 is an isometric view of the field termination platform of FIGS. 24 and 25 having a fiber being installed therein according to an alternative embodiment of the present invention.

Another alternative field termination platform or tool 400 is shown with respect to FIGS. 24-26. With this alternative field termination platform, the tool provides for repeatable, accurate fiber insertion in the optical connector and applies the correct bow length/force regardless of the fiber type. Moreover, the field termination platform of this alternative embodiment allows the field technician to utilize a fully assembled connector during termination. The field termination platform of this alternative embodiment can be made inexpensively to provide a low cost tool to the customer.

Platform 400 includes a base portion 410 having a guide channel 412, a drag finger 413 and a stop release lever 411 formed therein. Platform 400 further includes a connector mount or holder 402 that is configured to receive and secure an optical connector, such as connector 100, shown in FIG. 17, during the fiber termination procedure. The connector holder 402 may be attached to the platform by a mechanical fastener, such as screws or snap catches. Alternatively, the connector holder 402 may be connected to the platform by an adhesive or other bonding technique, such as welding. The connector holder 402 can be preferentially attached to the base portion 410 by a releasable fastener to allow for connector holder replacement when a different connector format is used.

Platform 400 can further include an actuation mechanism 440 that includes a cap actuator or driver 446 that is configured to contact and press against the splice cap of the connector, such as splice cap 144 of the mechanical splice (see FIG. 20). For example, a pressing movement can be applied to cap actuator or driver 446 to displace the driver towards the cap until contact is made to actuate the mechanical splice. In this exemplary embodiment, the driver 446 can be coupled to base 410 via levers 444. In addition, levers 444 can be configured to engage a side of base 410.

In addition, platform 400 includes a fiber holder assembly 470 that includes a fiber holder assembly base 472. In a preferred aspect of this embodiment, the fiber holder assembly base 472 is configured to be slidably received in channel 412 of the platform base 410. In addition, the fiber holder assembly base 472 further includes its own channel or slot 471 formed therein. According to an exemplary aspect of this embodiment, platform base 410, fiber holder assembly 470, and components thereof, can be formed or molded from a polymer material.

As shown in FIG. 25, fiber holder assembly 470 includes a buffer clamp actuator 480 and fiber holder portions 492A, 492B, and 492C. The fiber holder portions are provided to support and temporarily secure an optical fiber during the termination process. The fiber holder portion can each include one or more aligned fiber guides or channels to provide more axial support of the fiber along a substantial distance of the platform. For example, fiber guides or channels 491A-E can be provided.

In this exemplary embodiment, the first fiber holder 492A is formed as part of buffer clamp actuator 480, thus as a subassembly of assembly 470 that is slidably received in the slot or channel 471. The buffer clamp actuator 480 also includes a funnel-shaped fiber guide (or funnel) 482 that can both guide a fiber and actuate a buffer clamp mechanism of a connector 100 held in mount 402.

The fiber holder assembly base 472 includes a second fiber holder portion 492B and a third fiber holder portion or fiber clamp 492C, each of which are pivotably attached to the fiber holder assembly base 472. In addition, fiber holder portions 492A, B and C can utilize the same or different clamping mechanisms. For example, fiber holder 492A can be snap closed over a fiber when inserted, but the holder cover can float so as to accept different fiber diameters. Fiber holder portion 492B can be closed over the fiber once inserted but is preferably not latched, thus using gravity to retain the fiber. Fiber holder portion 492C can be configured as a fiber clamp that can be snapped closed over a fiber once inserted to securely hold it in the fiber holder assembly.

The base 410 further includes stops 420 that are configured to stop the forward sliding motion of buffer clamp actuator 480, for example, by contacting buffer clamp handles or lobes 486A and 486B. Stops 420 can further be configured to slightly overhang channel 412 to help prevent base 472 from rising out of channel 412 during fiber bowing.

Fiber holder assembly base 472 further includes stops 473A and 473B that can be configured to engage with stops formed in base 410 and, optionally, be received in and engage with a conventional fiber cleaver. Thus the fiber can be kept in the same tool before and after fiber end preparation.

Buffer clamp actuator 480 is configured to engage or otherwise actuate a buffer clamp sleeve, such as buffer clamp sleeve 160 (see e.g., FIG. 20). For example, buffer clamp actuator 480 can include funnel-shaped fiber guide 482 and a tip portion 481 configured to contact sleeve 160, or a portion thereof. The funnel-shaped portion provides a guide for a fiber, such as an optical fiber 135 to be inserted therethrough. Buffer clamp actuator 480 can further include handles or lobes 486A and 486B that provide accessible contact points for a user to slide the buffer clamp actuator during fiber termination.

The fiber holder portions can each include at least one fiber guide to guide a fiber to be terminated. For example, fiber holder 492C can be formed as an eccentric clamp, to be used to hold the fiber in guide 491D during termination when placed in a closed position. Additionally, fiber holder 492C can include a piece of foam 493 (or other compliant material) attached to the underside thereof to conform to a fiber being clamped therein. In addition, a fiber channel 491E can be disposed at an end of the fiber holder assembly base 472 to provide further support. Using this configuration, fibers with differing cover stiffness can be gripped and guided by this platform 400 in a straightforward manner.

As mentioned above, in this alternative embodiment, platform 400 includes a base portion 410 having a drag finger 413 and a stop release lever 411 formed therein. Drag finger 413 can be formed as a protrusion such that when fiber holder assembly base 472 is slidably placed within channel 412, drag finger 413 can engage with or press against the side of fiber holder assembly base 472 to temporarily hold fiber holder assembly base 472 in place, such as to prevent axial movement of the assembly base 472 as a fiber being terminated begins bowing.

Stop release lever 411 can also be formed in base 410 to provide an interlocking feature so that the buffer clamp of the connector, e.g., sleeve 160, is not prematurely actuated by buffer clamp actuator 480. For example, near the end of its track, the buffer clamp actuator 480 subassembly can be prevented from further movement until the stop release lever 411 is activated. In this exemplary embodiment, the stop release lever 411 can be formed as a push mechanism having an arm 414 that engages one of the buffer clamp handles or lobes 486A and 486B until the push mechanism is triggered by the user, thus displacing arm 414 to disengage with the buffer clamp handle or lobe.

In practice, a fiber termination process can utilize the platform 400 to terminate an optical fiber in the field to an optical connector 100 in a straightforward manner. In addition, the field technician can utilize an optical connector that is fully assembled in the factory, such that additional connector assembly is not necessary in the field.

For example, a connector 100 can be installed in connector coupling or holder 402, e.g., by a snap fit. In this example, a connector 100 such as shown in FIG. 17 can be utilized having a boot 180' that includes a funnel-shaped tail section 183, pre-mounted on the optical connector. After connector mounting, the splice actuation mechanism 440 can be returned to a pre-activation position just above the splice cap 144.

An optical fiber, such as optical fiber 135, can be prepared by stripping and cleaving (flat or angled) to match the orientation of the pre-installed fiber stub of the optical connector. Optical fiber 135 can be prepared prior to insertion in assembly 470 or after insertion in assembly 470. In one aspect, for fiber end preparation, a portion of the fiber can extend by a suitable amount, for example about 40 mm to 50 mm, beyond the end of the fiber holder assembly. The buffer clamp actuator 480 can be spaced from holder 470 along slot or channel 471 by a suitable amount to provide fiber support during stripping and cleaving. The fiber jacket/plastic coating can be stripped using a conventional mechanical fiber stripper. A small amount of plastic coating can extend beyond the end of assembly 470. The glass portion of the fiber can be wiped clean. Cleaving, using a conventional cleaver, such as described above, can be performed as the fiber is held in place in the fiber clamp assembly.

Prior to actuation, the buffer clamp actuator 480 can be positioned at the front end of the fiber holder assembly 470. The optical fiber being terminated, such as fiber 135, can be installed in the fiber holder assembly by laying the fiber in funnel portion 482 of buffer clamp actuator 480 and on top of fiber guides 491A-E such that the end of the fiber extends beyond the tip portion 481. The fiber 135 can be held in place by engaging fiber holder portions 492A, B and C and placing one or more of the fiber holder portions in a closed position. The fiber holder portions can be configured to clamp a standard optical fiber outer jacket, such as a conventional fiber having 900 μm buffer sleeve or a 250 μm buffer sleeve.

The fiber can then be pulled back along the length of the fiber holder assembly such that the prepared end of the fiber is flush with the funnel tip 481. The positioning can protect the prepared fiber end during this portion of the termination procedure. In addition, this positioning allows initial insertion of the fiber end into the connector back end without having to visually locate the fiber tip, as the tip of the buffer clamp actuator can be used as a visual proxy.

The fiber holder assembly 470, with the prepared fiber held therein, can be inserted in channel 412 of the platform base 410. The fiber holder assembly can be moved forward (i.e., towards the mounted connector) by applying modest force to holder assembly base 472. The base 472 and buffer clamp actuator 480 move together along channel 412 until the stop release lever 411, e.g., arm 414, is engaged by at least one of the handles or lobes 486A and 486B. This engagement of the buffer clamp actuator 480 stops the funnel tip 481 from further movement until the stop release lever 411 is disengaged by the user, as is described above. The fiber assembly 472 can continue to be slid in channel 412.

As the assembly 472 is slid further forward, and as the prepared fiber end begins to contact the fiber stub in the mechanical splice of the connector body 101, the first fiber holder portion 492A can engage with cams 475 and 476 formed in the assembly base 472. As the cams 475 and 476 continue to move relative to the stationary buffer clamp subassembly 480, a first cam 475 can begin to lift fiber holder portion 492A. After further axial movement of base 472, the second cam 476 can lift the fiber holding portion 492A even further.

The gradual and automatic lifting of the fiber holder portion 492A allows the fiber 135 to bend or bow as the prepared end contacts the fiber stub without further axial displacement of the fiber. In addition, the cover of the second fiber holding portion 492B can also be designed to lift to accommodate for fiber bowing, such as can occur when using optical fibers of a particular stiffness. Further, the drag finger 413 can prevent the base 472 from sliding away from the connector mount as the fiber end contacts the fiber stub.

The cap actuator or driver 446 can then be pressed against the splice cap of the connector, such as splice cap 144, to actuate the mechanical splice in connector 100.

The stop release button 411 can then be pressed to release arm 414 from engaging at least one of handles or lobes 486A and 486B and to allow the buffer clamp actuator 480, especially tip portion 481 to move further forward toward the connector. The funnel tip 481 can be pushed fully forward to actuate the buffer clamp sleeve 160 of connector 100.

Upon buffer clamp actuation, the terminated connector is complete. The fiber clamp 492C can be returned to the open position, releasing the fiber bow and the connector 100 can be removed from the coupling 402.

Thus, as is understood in view of the description above, the platform of the alternative embodiment can accommodate a wider range of fibers and fiber stiffness, such as 250 μm coating, 900 μm soft PVC coating, 900 μm rigid nylon coating, etc. This platform maintains an acceptable axial force on fiber-tip. The force should be high enough so the fiber is inserted into the connector splice region, yet does not have excess force which can damage fiber tip. The tool can allow for suitable insertion of the fiber into the tool and straightforward release of the assembled connector from the tool.

Figure 28B:
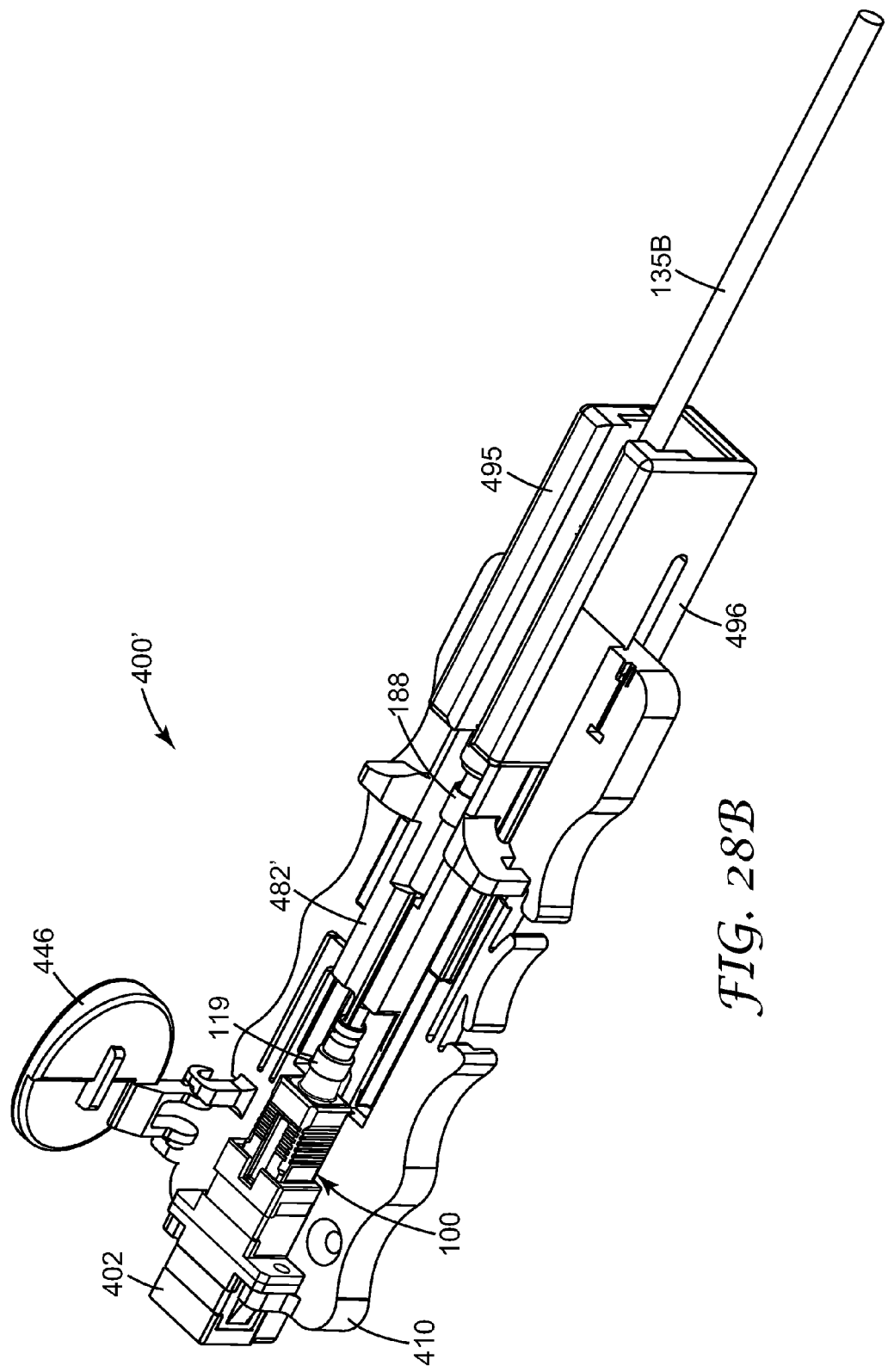

In a further alternative aspect, a platform 400', such as shown in FIGS. 28A and 28B, can be utilized for terminating a fiber with a connector 100 having a boot construction such as described above in regards to boot 180" shown in FIGS. 27A and 27B. As mentioned above, boot 180" can include a cable crimp ring 119 to crimp the strength member(s) of the fiber cable 135B on the adapter ring 188 of connector 100. The boot 180" also includes an outer jacket 187 comprising a polymer material and a cable jacket crimp ring 189 (shown in FIG. 27B), which is configured to directly crimp onto the jacket of the fiber cable 135B. An exemplary fiber cable 135B comprises a 3.5 mm jacketed drop cable for a 900 μm optical fiber.

In particular, platform 400' can be constructed in a manner similar to platform 400 described above. For example, platform 400' can include a base portion 410 and a connector mount or holder 402 that is configured to receive and secure an optical connector 100. Platform 400' can further include an actuation mechanism 440 that includes a cap actuator or driver 446 that is configured to contact and press against the splice cap of the connector.

In addition, due to the configuration of the base 180", platform 400' can include a buffer clamp actuator, mounted on a fiber holder assembly (such as described above), that is configured to engage or otherwise actuate a buffer clamp sleeve, such as buffer clamp sleeve 160 (see e.g., FIG. 20). In this exemplary embodiment, a fiber guide 482' can be used to contact a buffer clamp sleeve, or a portion thereof. The fiber guide 482' provides a guide for a jacketed fiber, such as an optical fiber 135B to be inserted therethrough. In addition, the fiber guide 482' does not require a funnel shape and can be configured to slide inside adapter ring 188.

As mentioned above, the backbone of the connector 100 can be fitted with an adapter ring 188, formed from a metal, such as aluminum, and fitted onto the connector backbone 118 (see FIG. 2). The adapter ring can retain the buffer clamp sleeve in the open position during shipping and can guide the buffer clamp ring actuation guide 482'. The adapter ring can also protect the connector body, especially the connector backbone, from damage during crimping of the cable strength member(s).

During fiber termination in the field, the boot, such as boot 180", can be placed onto the cable, where the fiber strength member(s) (not shown), can be folded back over ring 119. The jacketed fiber can be stripped and cleaved. The jacketed portion can be placed in a fiber cable holder 495, which grips the fiber cable 135B such that the motion of the fiber tip (and the strength member(s)) relative to the cable outer jacket is fixed. A slot is preferably formed in holder 495 to allow the service technician access to the boot components. Also, in a preferred aspect, a clamp is provided at or near the back end of holder 495. The fiber cable holder 495 can also include a ridge structure on an inner surface to provide further support for the fiber cable during termination.

A connector 100 can be placed in mount 402 and the fiber holder assembly with the buffer clamp actuator can be mounted in the guide channel such as is described above with respect to FIGS. 24-26. The guide tip can be placed in position to contact of an end of the buffer clamp sleeve.

As shown in sequence view in FIGS. 28A and 28B, the prepared fiber tip can then be threaded through the buffer clamp actuator by advancing the fiber cable holder 495 until it reaches its forward position. For example, a flexible latch member 496 formed on a side of fiber cable holder 495 can engage a portion of the base 410 to hold the fiber cable holder 495 in place during termination. This advancement can create a fiber bow (such as described above) to provide axial preload for splicing. The actuator mechanism 446 can then be depressed to actuate the fiber splice.

As with the procedure described above with respect to FIGS. 24-26, the buffer clamp actuator lobes can be pressed forward to actuate the buffer clamp sleeve of connector the 100. After the connector 100 is removed from the platform, the boot 180" can then be secured in place by sliding the strength member(s) over the adapter ring and crimping the strength member(s) between the adapter ring 188 and the crimp ring 119. The excess strength member(s) can be trimmed off. The crimping can be performed using a standard crimp tool (similar to commercially available SC connector crimp tools). The connector, attached cable, and fiber cable holder 495 can then be removed from the base. The boot 180" can then be slid into position over the backbone adapter ring 188, while still maintaining proper positioning of the fiber, strength member(s), and the cable jacket using the fiber cable holder 495. The boot 180" can be brought into place. The jacket crimp ring can then be crimped using a conventional crimping tool to secure the cable components in proper relation to each other. Clamp 495 may then be removed.

The platform 400' of this alternative embodiment can accommodate a 3.5 mm jacketed cable with strain relief to the strength member(s) and can be capable of providing pull force strain relief to the connector backbone, for example, withstanding a pulling force of about 4.4 Lb-F (19.6 N). In addition, such a construction and termination platform provides for more rugged handling by service technicians in outside plant conditions, such as for fiber to the home markets, e.g., by reducing the need for service technicians to handle fragile unjacketed 250 µm or 900 µm fiber and reducing the need for fiber storage trays.

In another example, as shown in FIGS. 30A and 30B, an alternative platform 400", similar to the platforms shown above, includes an actuation mechanism 440 and a fiber holder assembly 470" receivable by a guide channel formed in base 410. In addition, a buffer clamp actuator fiber guide portion 482 is included to actuate a buffer clamp of the optical connector, e.g., by sliding buffer clamp handles or lobes 486A and 486B towards the connector. Platform 400" also includes a fiber cable jacket gripping device 499 that includes a handle portion 499A and a slot 499B configured to grip the outer jacket of a fiber cable, such as cable 135B, such that the motion of the fiber tip (and the strength member(s)) relative to the cable outer jacket is fixed. As shown in FIG. 30A, the gripping device 499 can be slidably received in a grip holder portion 498 disposed on an end of the fiber cable holder 495". The grip holder portion 498 includes a channel to receive a fiber cable and an orthogonal opening to receive the jacket gripping device 499. The jacket gripping device 499 is then inserted into the opening and slid towards the cable until the outer jacket of the cable is gripped by slot 499B. Holder 495" also includes an open base section having a slot 497 configured to provide access to and secure an optical fiber boot, such as boot 180" shown in FIGS. 27A and 27B, during the termination procedure.

The optical connectors described above can be used in many conventional optical connector applications such as drop cables and/or jumpers. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications.

Figure 29A:
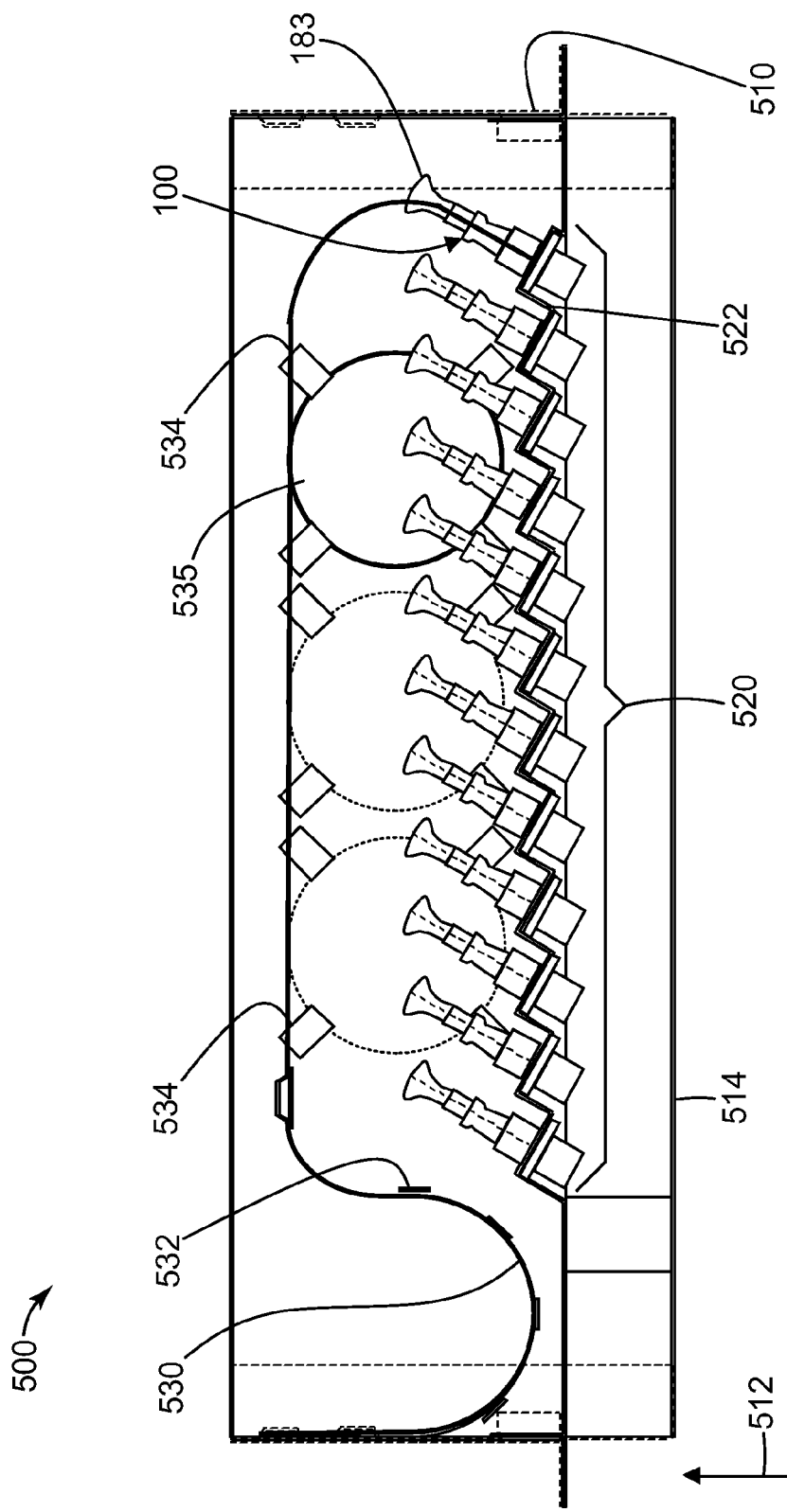
FIGS. 29A and 29B show top views of a fiber distribution platform (in closed and open positions, respectively) utilizing an optical connector according to another embodiment of the present invention.
Figure 29B:
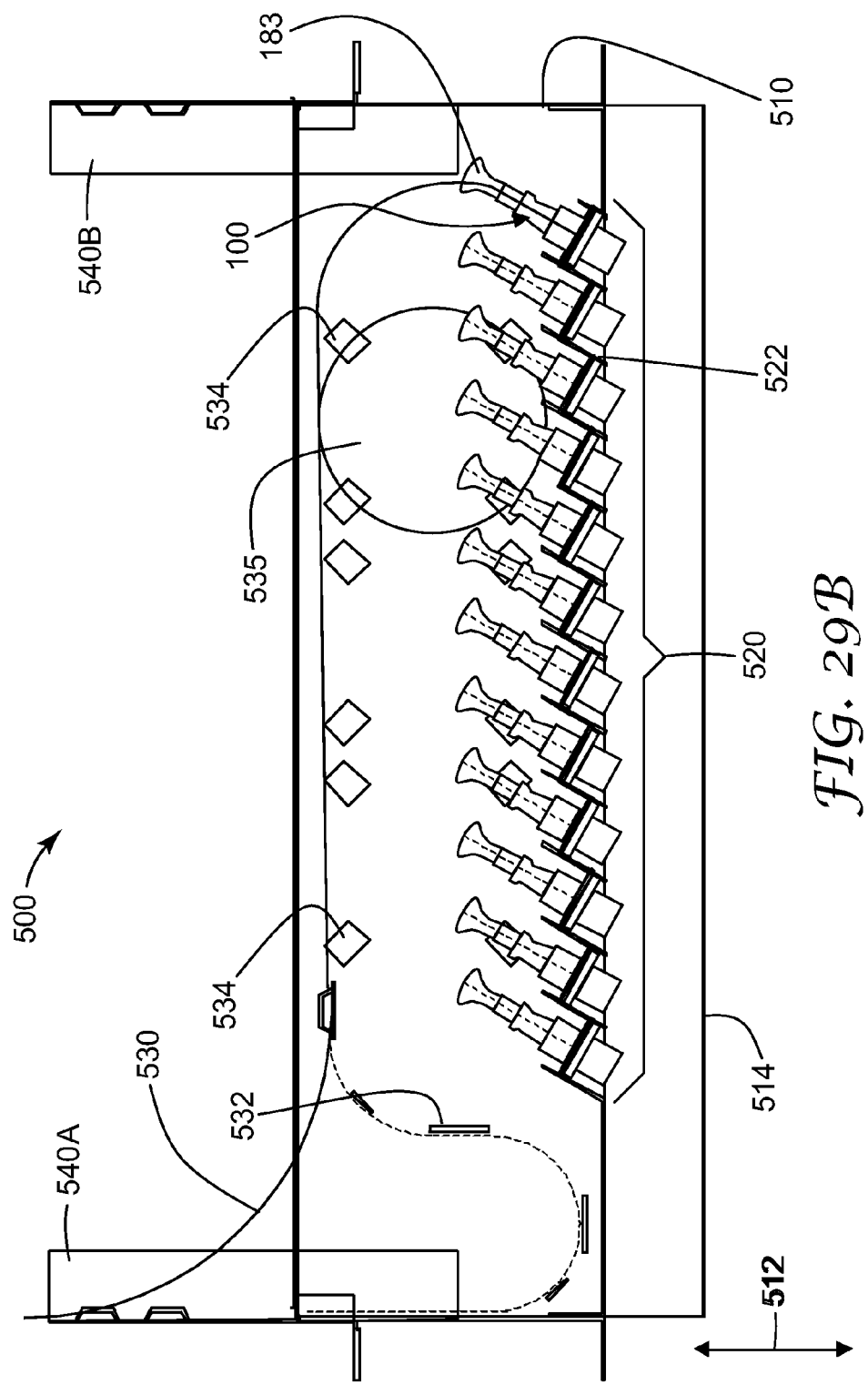

As mentioned above, the optical connector of the exemplary embodiments is of compact length and is capable of straightforward field termination with reduced assembly times. Such exemplary connectors can be readily installed and utilized for FTTP and/or FTTX network installations. For example, as shown in FIGS. 29A and 29B, an optical connector, having a structure such as that of optical connector 100 described above with respect to FIG. 17, can be utilized as part of a fiber distribution unit 500.

Currently, conventional fiber distribution trays (such as the BCCO II Sliding Optical Patch Panel, available from 3M Company, St. Paul, Minn.) include fiber pigtails (each having one end pre-terminated to a connector) that is spliced to the fiber distribution cable at a separate splice tray portion. With the connectors of the exemplary embodiments described herein, pre-connectorized pigtails are not required, as individual lines are terminated in the field at the connector. This design provides for a more compact fiber distribution tray. Thus, the use of connectors 100 in certain applications can eliminate the need for separate splice tray features.

Fiber distribution unit 500 includes a tray 510 movably mountable to a fiber distribution cabinet. Tray 510 can be preferably formed from a rigid metal or plastic material. For example, tray 510 can be coupled to left and right brackets 540A and 540B, which can be coupled on vertical rails of a conventional telecommunications equipment rack to allow for opening and closing of the unit along axis 512. Fiber distribution unit 500 can be utilized, for example, in a central office environment (e.g., in an equipment rack or optical distribution frame) and in an outside plant environment (or in a fiber distribution cabinet or hub).

Fiber distribution unit 500 can house a plurality of connectors mounted to couplings 522 on front face 520. Each of the connectors 100 can terminate an individual fiber line 530 from a distribution cable (not shown) that includes a plurality of individual fiber lines. The front face couplings 522 can each be mounted at an angle to provide for a more compact unit as angle mounting can reduce the space required in front of the panel for the bending of the patch cord. Alternatively, the front face couplings 522 can each be mounted in substantial alignment with axis 512.

Each of the front face couplings 532 can be designed to receive a connector 100 at one end and a standard connector (e.g., an SC or LC) at the other end. Alternatively, each of the front face couplings 532 can be designed to receive a connector 100 at both ends. In addition, the front face 520 can include more than one row of couplings (for example, a second row can be provided directly beneath the couplings 522 shown in FIGS. 29A and 29B). Tray 510 can also be configured to include a shelf 514 that extends beyond the couplings 522 so as to protect the connectors on the front side and establish the bending radius of the patch cord connected to the couplers from the front of the fiber distribution unit 500 from inadvertent contact.

For example, fiber distribution unit 500 includes a set of fiber guides 532 that guide fiber 530 into position when unit 500 is placed in a closed position, such as shown in FIG. 29A. When the unit is placed in the open position, as shown in FIG. 29B, fiber 530 is free to move from guides 532. In addition, fiber distribution unit 500 includes one or more sets of fiber retainer clips or structures 534 provided on tray 510 that provide compact fiber slack looping. As shown in FIGS. 29A and 29B, fiber 530 is coupled to connector 100. Excess fiber length is stored in a loop 535. As shown in FIGS. 29A and 29B, at least a portion of fiber loop 535 is positioned underneath the connector area, those providing for a more compact tray design.

In addition, using an exemplary connector 100 having a boot 183, such as described above with respect to FIG. 17, can provide for a more compact fiber looping, and hence a fiber tray of shorter depth, as the boot can accommodate a fiber bend at the backbone end of the connector, as opposed to the end of a conventional boot. In addition, the connector/unit design can reduce the risk that the fiber is bent beyond its minimum bending radius, which can cause optical signal degradation. The connector design can further provide for more compact configurations in other outside plant applications, such as pedestals, closures, terminals, and fiber NIDS, to name a few.

Various modifications, equivalent processes, as well as numerous structures to which the present invention may be applicable will be readily apparent to those of skill in the art to which the present invention is directed upon review of the present specification.

We claim:

1. A fiber termination platform, comprising:
   a base configured to hold an optical fiber connector having a pre-assembled fiber stub;
   a first actuation mechanism disposed on the base to actuate a splice element of the optical connector and a second actuation mechanism to actuate a buffer clamping portion of the optical connector; and
   a fiber holder to hold the optical fiber in the termination platform during termination.

2. The fiber termination platform of claim 1, wherein the base includes a connector mounting section to receive and temporarily secure a connect body of the optical fiber connector.

3. The fiber termination platform of claim 2, wherein the first actuation mechanism is disposed on a splice actuation section of the base.

4. The fiber termination platform of claim 3, wherein the fiber holder is disposed on a fiber alignment section.

5. The fiber termination platform of claim 4, wherein at least one of the connector mounting section, the splice actuation section, and the fiber alignment section is movable with respect to the other sections.

6. The fiber termination platform of claim 1, wherein the platform includes two or more separate fiber guide structures.

7. The fiber termination platform of claim 1, wherein the first actuation mechanism is configured as a driver to contact and actuate a splice cap upon receiving a pressing force and wherein the second actuation mechanism engages a buffer clamping sleeve of the optical fiber connector and axially displaces the sleeve along the fiber so as to actuate a clamping of the buffer of the optical fiber.

8. A fiber termination platform, comprising:
   a base having a guide channel disposed therein;
   a connector mount disposed on the base configured to receive and releasably secure an optical fiber connector;
   an actuation mechanism that includes a cap driver configured to contact and press against a splice cap of the optical fiber connector;
   a fiber holder assembly that includes a fiber holder assembly base configured to be slidably received in the guide channel disposed in the base; and
   a buffer clamp actuator to actuate a buffer clamping portion of the optical fiber connector.

9. The fiber termination platform of claim 8, further comprising at least a first fiber holder portion to temporarily secure and provide axial support of an optical fiber to be terminated in the optical fiber connector.

10. The fiber termination platform of claim 8, comprising a plurality of fiber holder portions to provide one or more aligned fiber guide channels disposed along a substantial distance of the platform.

11. The fiber termination platform of claim 10, wherein the fiber holder assembly base includes a guide channel disposed therein.

12. The fiber termination platform of claim 11, wherein a first fiber holder portion is formed as part of the buffer clamp actuator and is slidably received in the guide channel disposed in the fiber holder assembly base.

13. The fiber termination platform of claim 12, wherein the buffer clamp actuator includes a funnel-shaped fiber guide to guide and align the optical fiber, wherein a tip portion of the funnel-shaped fiber guide engages at least a portion of an axially displaceable buffer clamp mechanism of the optical fiber connector.

14. The fiber termination platform of claim 12, wherein the fiber holder assembly base includes a second fiber holder portion and a third fiber holder portion, each of which are pivotably attached to the fiber holder assembly base.

15. The fiber termination platform of claim 11, wherein the base further includes a stop structure configured to stop a forward sliding motion of buffer clamp actuator.

16. The fiber termination platform of claim 15, wherein the stop structure is configured to overhang the guide channel of the base by an amount sufficient to prevent the fiber holder assembly base from rising out of the guide channel of the base during a fiber bowing.

17. The fiber termination platform of claim 13, wherein the buffer clamp actuator further includes at least one lobe structure to provide an accessible contact point to a user to slide the buffer clamp actuator during fiber termination.

18. The fiber termination platform of claim 13, wherein the base includes a drag finger and a stop release lever formed therein:
   wherein the drag finger comprises a protrusion to engage the fiber holder assembly base within the guide channel of the base to temporarily hold the fiber holder assembly base in place to prevent axial movement of the assembly base as a fiber being terminated begins bowing; and
   wherein the stop release is configured as an interlock to prevent movement of the buffer clamp actuator until the stop release lever is activated.

19. The fiber termination platform of claim 10, wherein the fiber holder portions are configured to clamp at least both of a 900 μm buffer sleeve and a 250 μm buffer sleeve.

20. A fiber termination platform, comprising:
a base portion having a connector mount disposed thereon that is configured to receive and releasably secure an optical connector, the base having a guide channel disposed therein;
an actuation mechanism to actuate a splice element of the optical connector;
a buffer clamp actuator mounted on a fiber holder assembly configured to engage a buffer clamp mechanism of the optical connector; and
a fiber cable holder configured to grip a jacketed portion of an optical fiber cable that includes at least one strength member and the optical fiber to be terminated such that a motion of a fiber tip and the at least one fiber strength member is fixed relative to the cable outer jacket.

21. The fiber termination platform of claim 20, wherein the fiber cable holder is configured to hold a fiber boot surrounding the fiber cable, wherein the fiber cable holder includes a slot formed along a portion of its length to provide access to the fiber cable and boot.

22. The fiber termination platform of claim 20, wherein at least a portion of the fiber cable holder can be slidably received in the guide channel.

23. A method for terminating an optical fiber in an optical connector, comprising:
providing an optical fiber connector having a pre-assembled fiber stub, wherein the optical fiber connector includes a mechanical splice element and a buffer clamp element, wherein the optical connector is pre-assembled and held on a termination platform;
preparing an end of an optical fiber to be terminated with the fiber stub, wherein the fiber preparation includes stripping off a portion of a plastic outer jacket of the optical fiber to be terminated and cleaving the fiber end;
inserting the prepared fiber in the pre-assembled optical connector until a fiber bow is evident;
actuating the splice element to couple the prepared end to the fiber stub;
clamping a buffer portion of the optical fiber within the optical connector; and
releasing the fiber bow.

24. The method of claim 23, wherein the optical fiber is held in a portion of the termination platform during preparation.

25. The method of claim 23, further comprising:
crimping a fiber cable strength member of the optical fiber to an adapter ring fitted to the backbone of the optical connector.

26. The method of claim 23, further comprising:
gripping a jacketed portion of an optical fiber cable containing the optical fiber to be terminated such that a motion of the fiber end and a fiber strength member relative to the cable outer jacket is fixed.

* * * * *